United States Patent [19]

Young

[11] Patent Number: 4,706,121
[45] Date of Patent: Nov. 10, 1987

[54] TV SCHEDULE SYSTEM AND PROCESS

[76] Inventor: Patrick Young, 1496 Cherrywood Dr., San Mateo, Calif. 94403

[21] Appl. No.: 860,077

[22] Filed: May 6, 1986

Related U.S. Application Data

[63] Continuation-in-part of Ser. No. 754,630, Jul. 12, 1985, abandoned.

[51] Int. Cl.$^4$ .................. H04N 7/093; H04N 7/08
[52] U.S. Cl. .................. 358/142; 358/146; 358/147; 455/181; 455/186; 340/825.22
[58] Field of Search ............ 358/142, 146, 147, 191.1, 358/189, 84, 85, 86; 455/181, 186; 340/825.22

[56] References Cited

U.S. PATENT DOCUMENTS 4,170,782 10/1979 Miller .................. 358/84
4,488,179 12/1984 Krüger et al. .................. 358/147

FOREIGN PATENT DOCUMENTS 2034995 6/1980 United Kingdom .................. 455/186

Primary Examiner—James J. Groody
Assistant Examiner—Michael D. Parker
Attorney, Agent, or Firm—Flehr, Hohbach, Test, Albritton & Herbert

[57] ABSTRACT

A system (90) controls a television receiver (126) to allow user selection of broadcast programs from schedule information. A data processor (110) is connected to receive the schedule information from an FM receiver (94), decoder (98) and data demodulator (102). A user remote control transmitter 116-remote receiver (118) combination supplies user selection inputs to the data processor (110). The data processor (110) selects programs from the schedule information based on the user inputs. The schedule information for the selected programs is stored in a memory (111), and is used by the data processor (110) to control a programmable TV tuner (132) to provide the broadcast signals for the selected programs to the TV receiver (126) at the time of broadcast. The system (90) can also be used to control a VCR (150) for unattended recording of the selected programs.

56 Claims, 14 Drawing Figures

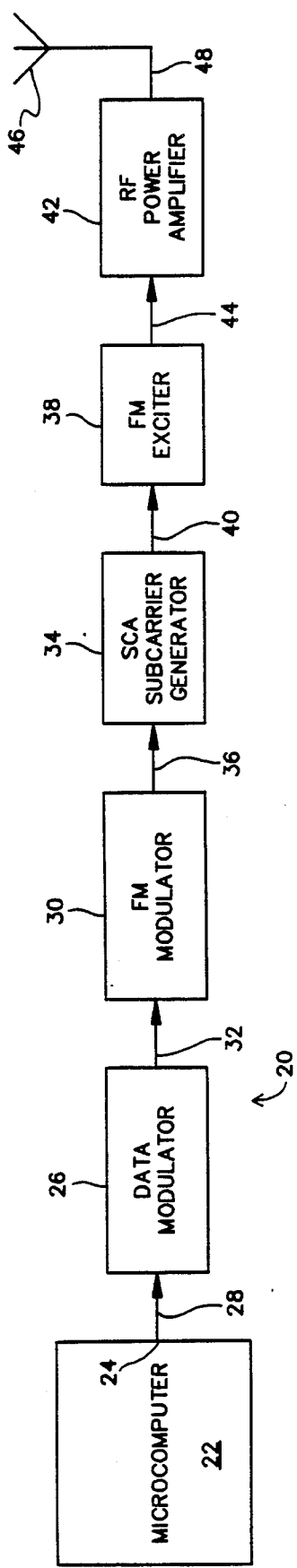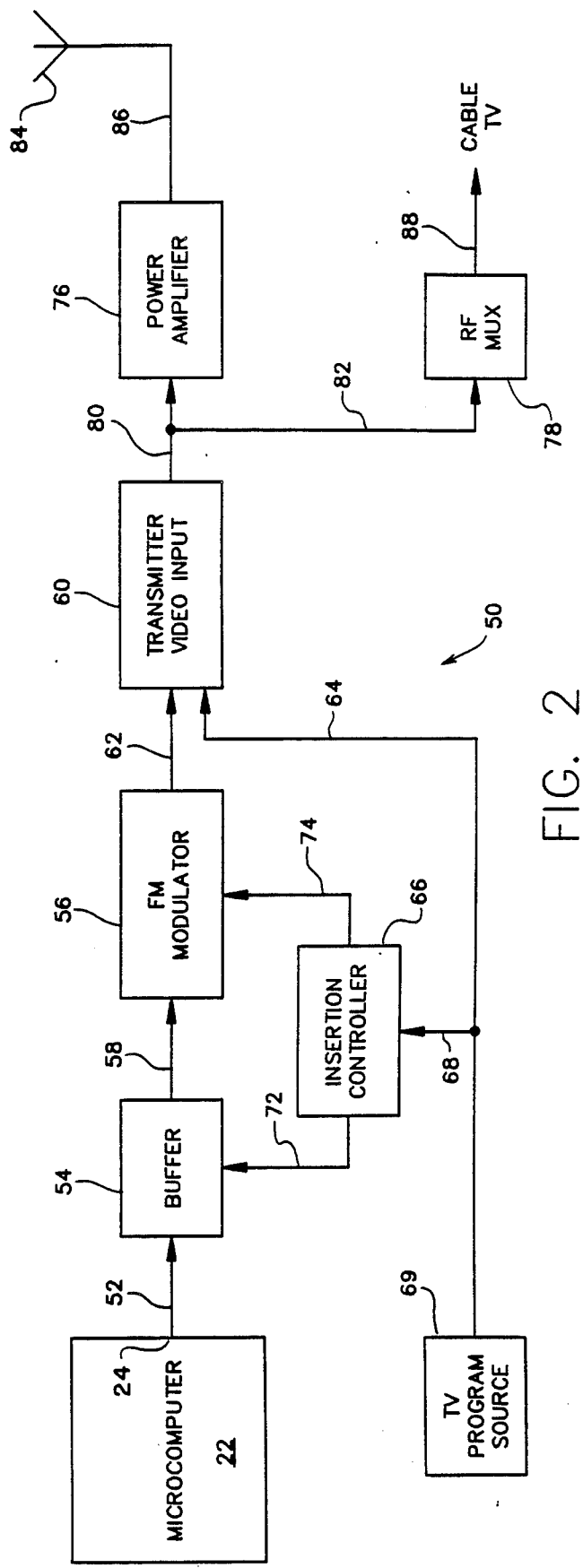

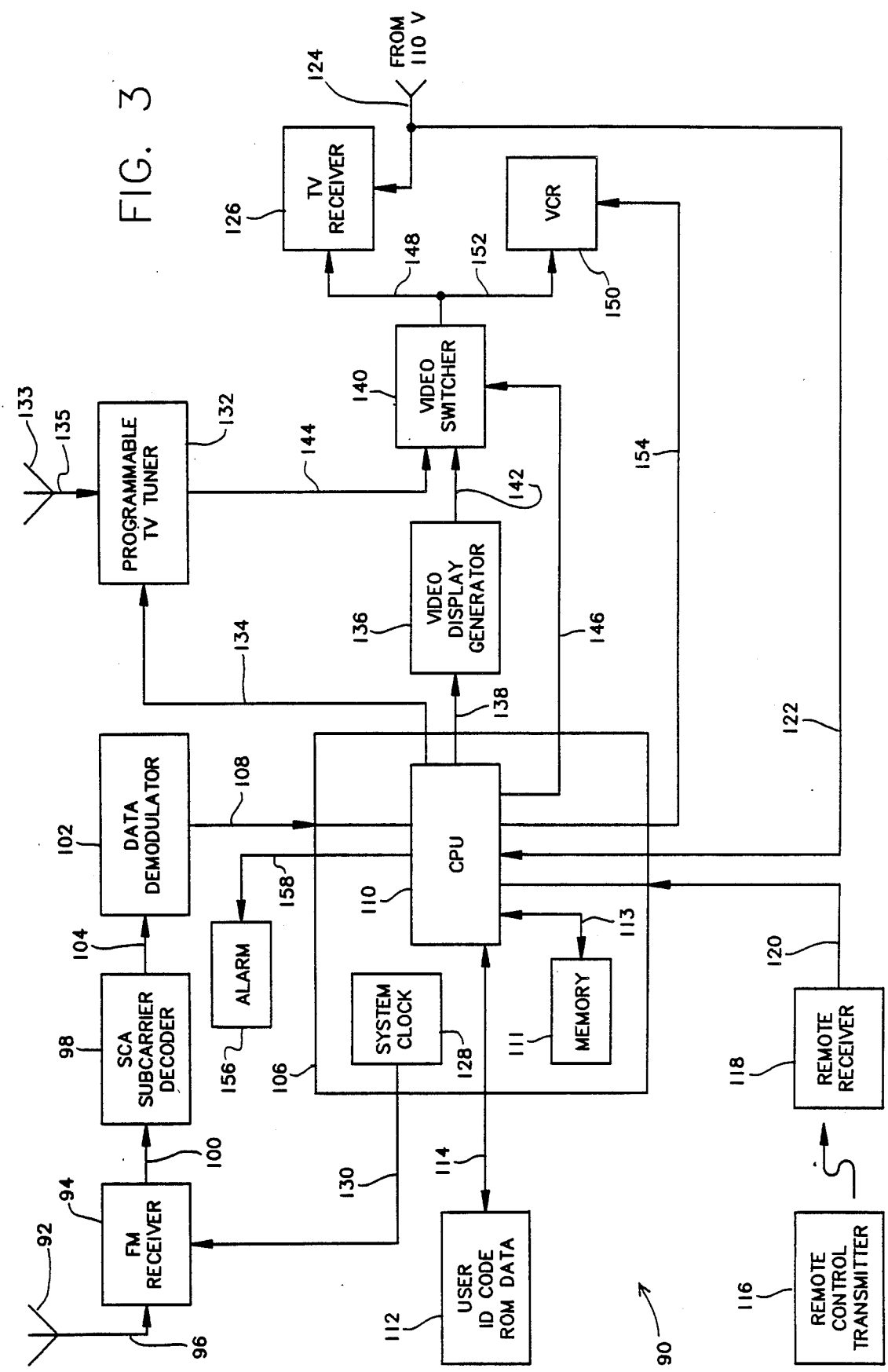

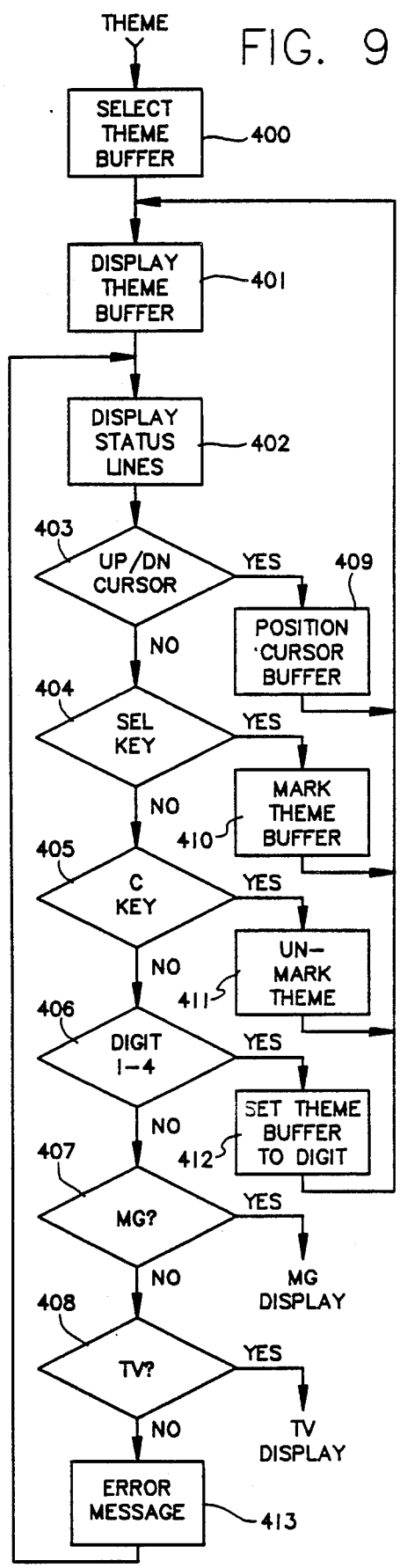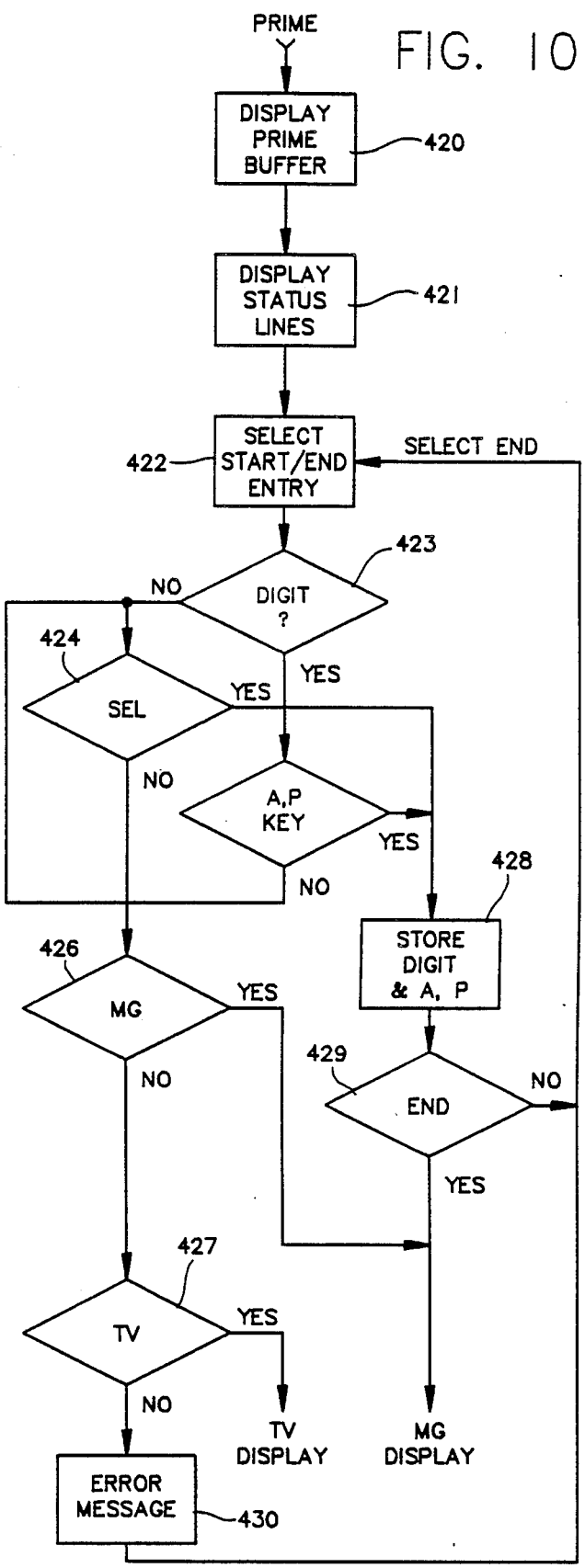
FIG. 9
FIG. 10

TV SCHEDULE SYSTEM AND PROCESS

ORIGIN OF THE APPLICATION

This application is a continuation-in-part of my application Ser. No. 754,630, filed July 12, 1985, now abandoned.

BACKGROUND OF THE INVENTION

1. Field of the Invention

This invention relates to an electronic system and a process for controlling a television set to present programs selected in advance from a schedule by a user. More particularly, it relates to such an electronic system and process which allows the user to make the broadcast program selection using selection criteria that can be combined in different ways. Most especially, the invention relates to such an electronic system and process which receives the schedule information in broadcast form and then processes the schedule information to make the selections. The invention further relates to a system that will enable a user to program a video cassette recorder (VCR) for unattended operation by making a simple selection from a menu.

2. Description of the Prior Art

A variety of electronic systems which can be connected to a conventional television receiver to increase the functionality of the receiver are known in the art. For example, systems that will allow a user to select teletext messages broadcast as auxilliary information in otherwise unused portions of conventional television broadcasts are disclosed in U.S. Pat. No. 4,186,413, issued Jan. 29, 1980 to Mortimer; U.S. Pat. No. 4,288,809, issued Sept. 8, 1981 to Yabe, and U.S. Pat. No. 4,361,848, issued Nov. 30, 1982 to Poignet et al. A variety of other electronic systems for controlling television sets or other related applications are disclosed in the following additional issued patents: U.S. Pat. No. 4,205,343, issued May 27, 1980 to Barrett; U.S. Pat. No. 4,225,967, issued Sept. 30, 1980 to Miwa et al.; U.S. Pat. No. 4,290,062, issued Sept. 15, 1981 to Marti et al.; U.S. Pat. No. 4,430,669, issued Feb. 7, 1984 to Cheung; and U.S. Pat. No. 4,506,387, issued Mar. 19, 1985 to Walter.

As the number of television stations in a metropolitan area or on a cable network has increased, a larger number of programs of potential interest to a viewer is presented. With the use of dish antennas capable of receiving direct satellite signals, the multitude of programs available to the viewer is further increased. At the present time, the user must consult a published program guide, such as TV Guide Magazine or program listings published in newspapers, in order to select programs for viewing. Particularly if the viewer is interested in a special category of program broadcast at irregular intervals, such as tennis tournaments, being aware of programs of special interest and selecting them for viewing is often difficult. Should the viewer find a program of interest which is broadcast at a time when the viewer will be unable to view the program, the user must then set a VCR or other recording device to record the program for viewing at a more convenient time. Often, a viewer will notice a program of special interest in the program listing, but forget to select the appropriate channel for viewing at the time of broadcast or set the VCR to record the program, or the length of the program for proper operation of the VCR to record the program. If there is more than one program to be recorded, it is easy to select programs with conflicting time schedules, with two or more programs overlapping each other. Conventionally published program listings are not capable of handling last minute schedule changes and additions. For these and other reasons, it would be advantageous if the viewer could select and view, or perform unattended recording of programs of interest in an easier and more dependable fashion.

Significant problems are encountered by users of VCRs as presently operated. Programming a VCR for unattended operation requires considerable skill and care. It is necessary to select the station, the day of the week, the time, including a.m. or p.m., and the length of the program for each program to be recorded. The process is even more complex if the user wishes to set the VCR for automatic recording of a program in the future at a given time while watching another program at the same time. Mary VCR owners are unable to master the complexities of setting the VCR for unattended operation, and simply do not use that feature of the equipment. Almost all users, at one time or another, have recorded the wrong program through an inadvertent incorrect setting of the VCR.

While a variety of systems incorporating VCRs and VCR control systems are known in the art, none deal with the complexity of setting a VCR for unattended recording. U.S. Pat. No. 4,523,295, issued June 11, 1985 to Zato discloses a VCR control system including a nonvolatile memory for storing user programmed system timing information in the event of a power outage. Other systems including VCRs are disclosed in the following issued U.S. Pat. Nos.: 4,272,791, issued June 9, 1981 to Rifken and U.S. Pat. No. 4,530,048, issued July 16, 1985 to Proper.

In most metropolitan areas, a large variety of cable programming is available. Since a cable channel will provide its signal on different numbered channels in different areas, depending on which channels are otherwise unused, programming for the cable channels is disseminated on a national or regional basis by the name of the channel, rather than the particular channel number on which the signal is supplied, while the television set must be tuned by the channel number. In the San Francisco metropolitan area, for example, there are presently 15 different cable channels that are listed by name, not channel number. A viewer will often not remember the channel number on which a given cable service is furnished, especially if that service is only watched occasionally. U.S. Pat. No. 4,405,946, issued Sept. 20, 1983 to Knight, discloses a system for providing an on-screen display of channel numbers or an indication that a signal is coming from a recording device, but with no teaching or suggestion of displaying a cable channel by name rather than number.

When satellite broadcasts are considered, the situation becomes even more complex. Satellite TV guides list all programs of satellites broadcast in the U.S. by the hour. Fifty or more programs may be listed under each hour or half hour heading. Depending on such factors as geographic location and equipment capability, many users will only be able to receive a small fraction of the listed programs. It would be desirable for a user to be able to reduce the number of such listings to be consulted in making a program selection. It would also be desirable for the viewer to be able to eliminate listings for encrypted programs for which the user is not a subscriber.

SUMMARY OF THE INVENTION

Accordingly, it is an object of this invention to provide a system and process which allows a user to control a television set by selecting broadcast programs for viewing from schedule information with user-supplied selection criteria.

It is another object of the invention to provide such a system and process which receives the schedule information as a broadcast.

It is another object of the invention to provide such a system and process which is capable of accommodating last minute schedule changes and additions.

It is a further object of the invention to provide such a system in which the user supplied selection criteria can be combined by the system to make program selection.

It is a still further object of the invention to provide such a system and process in which the selection criteria can be either criteria of inclusion or exclusion.

It is another object of the invention to provide such a system and process in which the need to make manual channel selection is eliminated and all programs are selected by pointing to menu items.

It is still another object of the invention to provide such a system and process which will determine if the television set is turned on at the time of the selected broadcast program and automatically supply the selected program to a VCR or other program recording device if the television set is not turned on.

Independently of the television set, it is another object of the invention to provide greatly simplified and reliable unattended recording of television programs.

It is a still further object of the invention to provide such a system and process which is capable of selecting a single program in a multiple program series and automatically including the rest of the programs in the series.

It is another object of the invention to provide such a system and process which will automatically terminate selection of a series of programs when the last program of the series has been completed.

It is yet another object of the invention to provide such a system and process which will automatically perform unattended recording of a program of uncertain length, such as a sporting event, and terminate the recording as soon as the program of uncertain length has been completed.

It is a further object of the invention to provide such a system and process which will allow certain programs and/or channels to be excluded from the selection unless the user enters a coded password.

It is still another object of the invention to provide such a system and process in which such user selections are used for unattended, automatic operation of a VCR or other recording device.

It is a still further object of the invention to provide such a system and process controlling a VCR in which the user selections are used for automatic, preselected recording of one program on a VCR while the user is viewing another program on a television set.

It is yet another object of the invention to provide such a system and process in which all parameters of a program for viewing and/or recording can be set with a single user selection.

It is a further object of the invention to provide such a system and process in which the user is not required to leave the VCR powered on for unattended recording.

It is a still further object of the invention to provide such a system and process in which the user is notified of conflicting time schedules for programs selected for viewing and/or recording.

It is another object of the invention to provide such a system and process in which a user identification system is employed to ensure pay subscription to the TV schedule system.

It is still another object of the invention to provide such a system and process in which special program linking and theme information is broadcast in order to allow easier program selection by the user.

It is a further object of the invention to provide such a system and process in which actual names of channel services, such as HBO, ESPN and the like, are displayed to the viewer and by which the viewer may select the channel service, in place of channel numbers on which such services are supplied.

It is still another object of the invention to provide such a system and process in which unique schedule data, such as linking, theme, satellite and channel name, satellite encryption, scrambled transmission, is supplied as a basis for the user to select listings for viewing and/or recording.

It is a still further object of the invention to provide such a system and process in which the length of time since a program being broadcast has started and how much time remains for the program is displayed to the user when the user turns on the program.

The attainment of these and related objects may be achieved through use of the novel electronic system and process for controlling a television receiver to allow user selection of broadcast programs herein disclosed. As used herein, the term "broadcast" refers not only to transmission by airwaves, but also to other forms of transmission, such as by cable. A system for controlling a television receiver to allow user selection of broadcast programs from schedule information in accordance with the invention includes a data processor. A first input means for the schedule information is connected to the data processor. A second user selection input means is also connected to the data processor. The data processor is configured to select programs from the schedule information based on user inputs. A storage means is connected to receive the schedule information for programs selected by the data processor. A programmable tuner is provided for connection to the television receiver. The programmable tuner is connected to receive control signals from the data processor for causing the programmable tuner to supply broadcast signals for the selected programs to the television receiver at the time of the selected program broadcasts.

The process of this invention includes the following steps. Program schedule information is supplied to a data processor. User program selection criteria are supplied to the data processor. The user selection criteria are used to select programs for viewing from the program schedule information in the data processor. The stored information is used to tune the television receiver to the selected programs.

In a preferred form of a system and process in accordance with the invention, the schedule information is also broadcast, either during an otherwise unused portion of a conventional television broadcast, such as during a horizontal or vertical flyback interval, or as a separate broadcast, such as a frequency modulation (FM) broadcast. The preferred system includes a video display generator connected to receive signals from the data processor for generating a video display from the schedule information and the user selections on the television receiver. The video display generator is connected to supply video display signals to a video switcher. The programmable tuner is also connected to supply the broadcast program signals to the video switcher. The data processor is configured and connected to control the video switcher to supply the broadcast program signals and/or the video display signals as required in operation of the system to the television receiver. In its preferred form, the data processor of the system is further configured to provide signals to the video display generator for presenting a plurality of user selection menus on the television receiver. The second user selection input means includes a plurality of keys for making selections from the menus for use in choosing programs from the scheduled information.

Once the system has been used by a viewer to make program selections on the basis of the viewer selected criteria, the system operation can be purely automatic, so that programs of special interest are not missed through forgetfulness. Because the system will search through a volume of schedule information to find programs meeting the viewer's selection criteria, the program selection is much easier and more rapid with the system of this invention than with manual selection. By way of example, the system can be used to select satellite programs from a larger list of satellite programs by user selected satellite symbols, such as F1 or AB, to be displayed by the scheduler, eliminating most of the program listings that are of no value to the viewer. Similarly, for viewers without special decryption service, the system will remove from display those satellite listings which are of no value to the viewer because they are encrypted.

In another aspect of the invention, the system can be automatically linked to a VCR, so that menu selection of programs to record replaces the often confusing techniques required to the unattended operation features of the VCR. By selecting a desired program for recording from a menu display, the chance for error is practically eliminated. The viewer can verify the programs to be recorded by a display of the names of the programs. In the event of a schedule change at the station, the system will automatically update the schedule change and revise the time of the unattended recording. In one form of this aspect of the invention, the system is connected to the remote control facilities of a VCR to turn on its power, start the recording, and stop recording of programs on the VCR. The user is therefore not required to leave the VCR powered on for unattended recording. In this manner, a conventional remote control VCR is connected in the system without modification for unattended recording of scheduled programs.

The attainment of the foregoing and related objects, advantages and features of the invention should be more readily apparent to those skilled in the art after review of the following more detailed description of the invention, taken together with the drawings, in which:

BRIEF DESCRIPTION OF THE DRAWINGS

FIG. 1 is a block diagram of a transmitter for use with a system and process in accordance with the invention.

FIG. 2 is a block diagram of another transmitter for use with another embodiment of a system and process in accordance with the invention.

FIG. 3 is a block diagram of a system in accordance with the invention for use with the transmitter of FIG. 1.

FIGS. 6–13 are flow charts of software used with the systems shown in FIGS. 3–4.

DETAILED DESCRIPTION OF THE INVENTION

1. General System and Process Description

Figure 4:
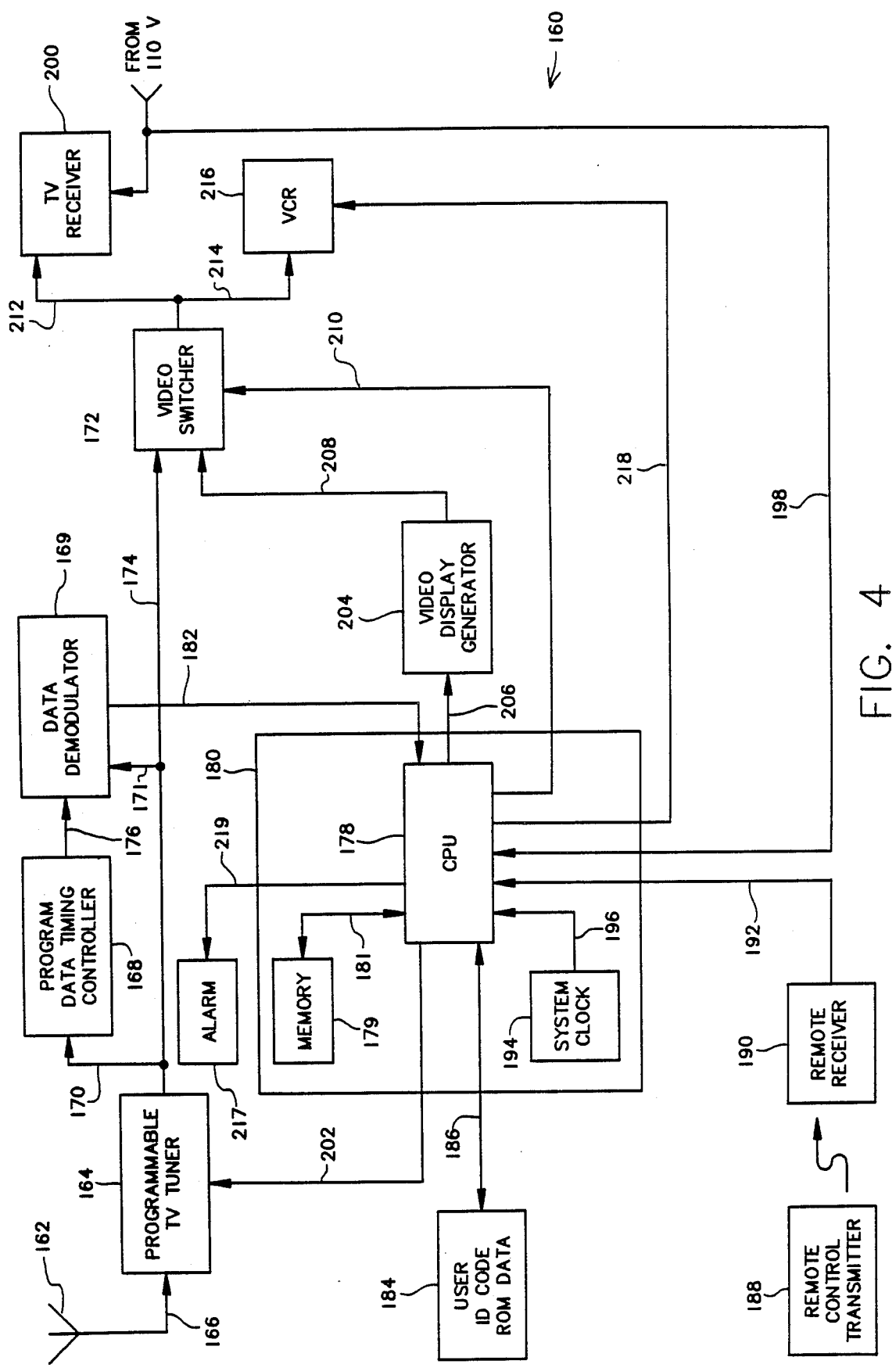
FIG. 4 is a block diagram of another system in accordance with the invention for use with the transmitter of FIG. 2.

Turning now to the drawings, more particularly to FIG. 1, there is shown a frequency modulation (FM) transmitter 20 for supplying TV schedule information as an FM broadcast. This form of a transmitter allows the necessary schedule information to be broadcast independently of the television broadcasts themselves. Other than making schedule information available to the provider of the FM broadcasts, this form of transmission does not require the cooperation of the television networks or stations. The transmitter 20 includes a microcomputer 22, connected by means of a serial input/output (I/O) port 24 to data modulator 26 by means of line 28. The microcomputer 22, which may be implemented with essentially any commerically available microcomputer, such as an IBM PC/AT or compatible, supplies the television schedule information as digital output signals to the data modulator 26. The data modulator 26 converts the digital outputs of the microcomputer 22 to a form in which they can be used to generate FM signals. The output of data modulator 26 is supplied to an FM modulator 30 on line 32. The FM modulator 30 generates a set of frequency modulated signals corresponding to the data, which are supplied to an SCA subcarrier generator 34 on line 36. The generator 34 produces the SCA subcarrier and applies the frequency modulated signals to the SCA subcarrier. The output of generator 34 is supplied to an FM exciter 38 on line 40. The exciter 38 generates the required FM broadcast signals, which are supplied to an RF power amplifier 42 on line 44. The power amplifier amplifies the FM broadcast signals and supplies them to transmitting antenna 46 on line 48. The data modulator 26, FM modulator 30, SCA subcarrier generator 34, FM exciter 38 and RF power amplifier 42 are all implemented with commercially available system components conventionally employed for broadcast of data processing information signals. Since the design and implementation of the system 20 is itself conventional, and the novelty resides in the particular data processing information signals broadcast with the system 20, the design and operation of the system 20 will not be described in further detail.

FIG. 2 is a block diagram of a similar system 50 that is used to broadcast the television schedule information as part of an otherwise conventional television broadcast, using a normally unused portion of the TV frame, such as the horizontal or vertical flyback. The I/O port 24 of the microcomputer 22 is connected by line 52 to a buffer 54, which converts the digital schedule information signals supplied by the microcomputer to a form suitable for FM modulation. The output of buffer 54 is supplied to an FM modulator 56 on line 58. The frequency modulated schedule information signals are provided by the modulator 56 for incorporation in the unused portion of the television broadcast in a transmitter video input unit 60 on line 62. Signals for a TV program to be broadcast are also supplied to the video input unit 60 on line 64 and to an insertion controller 66 on line 68 by program source 69, consisting of TV guide data as well as identification codes, in the case of pay subscriber service. The identification code is a unique 6 or 7 digit code for every subscriber. By deleting the identification code, an unpaid subscriber is prevented from receiving the TV guide data. The insertion controller 66 utilizes the program signals to generate synchronizing signals for the unused portions of the TV frame, which are supplied to the buffer 54 and the modulator 56 on lines 72 and 74, respectively. The combined program and schedule information broadcast signals are supplied by the transmitter video input unit 60 to a power amplifier 76 and an RF multiplexer 78 on lines 80 and 82, respectively. The amplified broadcast signals are supplied by amplifier 76 to a transmitting antenna 84 on line 86. The broadcast signals are supplied by multiplexer 78 as cable television signals at output 88. As in the case of the system 20, the system 50 is implemented with conventional system components. The system 50 is of a type conventionally employed for the broadcast of teletext signals in unused portions of a television program broadcast signal, and the novelty resides in the particular teletext signals broadcast in this manner. The design and operation of the system 50 will therefore not be explained in further detail.

FIG. 3 is a block diagram of a receiver and television receiver control system 90 which is used in combination with the FM transmitter system 20 of FIG. 1. An FM antenna 92 receives the broadcast signals from the system 20, which are supplied to FM receiver 94 on line 96. FM receiver 94 supplies the FM broadcast signals to an SCA subcarrier decoder 98 on line 100. The decoder 98 strips the schedule information signals from the FM broadcast signals and supplies the schedule information signals to a data demodulator 102 on line 104. The data demodulator 102 converts the schedule information signals to digital form and supplies the digital schedule data signals to system control unit 106 on line 108, more particularly, to CPU 110 of the system control unit 106. A memory 111 is connected to the CPU 110 at 113. A control program for the system control unit 106 and a user identification code are stored in a read only memory (ROM) 112. ROM 112 communicates with the CPU 110 on line 114. Other inputs to the CPU 110 are supplied by a remote transmitter controller 116-remote receiver 118 combination on line 120, which supplies user selection and other user inputs to the CPU 110, and on line 122, connected to power input 124 of television receiver 126, which allows CPU 110 to determine if the receiver 126 is turned on. System clock 128 of the system control unit 106 is connected to the FM receiver 94 by line 130.

The CPU 110 supplies control outputs, based on user selections, to a programmable TV tuner 132 on line 134. Information identifying programs selected from the schedule information on the basis of the user selection criteria is stored in memory 111 by the CPU 110. The CPU retrieves the information at the appropriate time for generating the control outputs. The tuner receives conventional TV broadcast signals from antenna 133 on line 135. The CPU 110 supplies information signals from the program schedule data on line 108, control program inputs on line 114 and user inputs on line 120 to a video display generator 136 on line 138. Output video display signals from the generator 136 are supplied to a video switcher 140 on line 142. The video switcher also receives TV program signals from tuner 132 on line 144, and a control signal for switching between the tuner 132 and the generator 136 on line 146 from the CPU 110. The video switcher 140 supplies the signals from the tuner 132 or the generator 142 to the TV receiver 126 on line 148 and to a video cassette recorder (VCR) 150 on line 152. The CPU 110 is connected to the VCR 150 by line 154, for turning on the VCR. For most VCRs, the line 154 should be connected to the pause input of the VCR. The CPU is connected to an alarm 156 by line 158 for indicating to a user a short time (e.g., five minutes) before a selected program is to be broadcast that the TV receiver 126 should be turned on if it is off, so that the selected program can be viewed. The operation of the receiver system 90 will be explained further in the explanation of the construction and operation of the controller 116 in connection with Figure 5.

FIG. 4 is a block diagram of another receiver system 160, which may be used with the transmitter system 50 shown in FIG. 2. Antenna 162 receives the TV broadcast signal from the transmitter system 50 and supplies it to a programmable TV tuner 164 on line 166. The tuner 164 supplies the broadcast signal to a program data timing controller 168 on line 170, to data demodulator 169 on line 171 and to a video switcher 172 on line 174. The output of controller 168 is supplied to the demodulator 169 on line 176. The demodulator 169 supplies the program schedule information signals, which have been stripped from the TV broadcast signals and digitized, to CPU 178 of system control unit 180 on line 182. A memory 179 is connected to the CPU 178 at 181 to receive selected program information and to supply the selected program information at the appropriate time for the CPU 178 to generate control signals for the programmable tuner 164. User ID code and control program inputs to the CPU are provided by ROM 184 on line 186. User program selections and other user inputs are provided by a remote control transmitter 188-remote receiver 190 combination on line 192. Other inputs to the CPU 178 are supplied by system clock 194 on line 196, and on line 198, connected to the power supply for TV receiver 200, in order to allow CPU 178 to determine if the TV receiver 200 is turned on. From the user inputs on line 192 and the control program, the CPU generates control signals for the programmable TV tuner 164, which are supplied on line 202, and video display information signals, which are supplied to video display generator 204 on line 206. The generator 204 converts the video display information signals to video display signals, which are supplied to the video switcher 172 on line 208. The CPU 178 supplies control signals for the video switcher 172 on line 210 to switch the video signal outputs of the video switcher 172 on lines 212 and 214 to the TV receiver 200 and VCR 216 between the schedule information video signals from generator 204 and the program video signals from tuner 164. The CPU 178 provides a control signal for turning on the VCR on line 218 when a desired television program signal is being received by tuner 164 and CPU 178 determines from the input on line 198 that TV receiver 200 is not turned on. The CPU 178 is connected to alarm 217 by line 219 for providing an audible signal to a user shortly before broadcast of a selected program if the TV receiver 200 is turned off, as a signal to turn it on. The operation of the cable TV or TV program receiver system 160 will be described further below in connection with FIGS. 5-13.

Figure 4B:
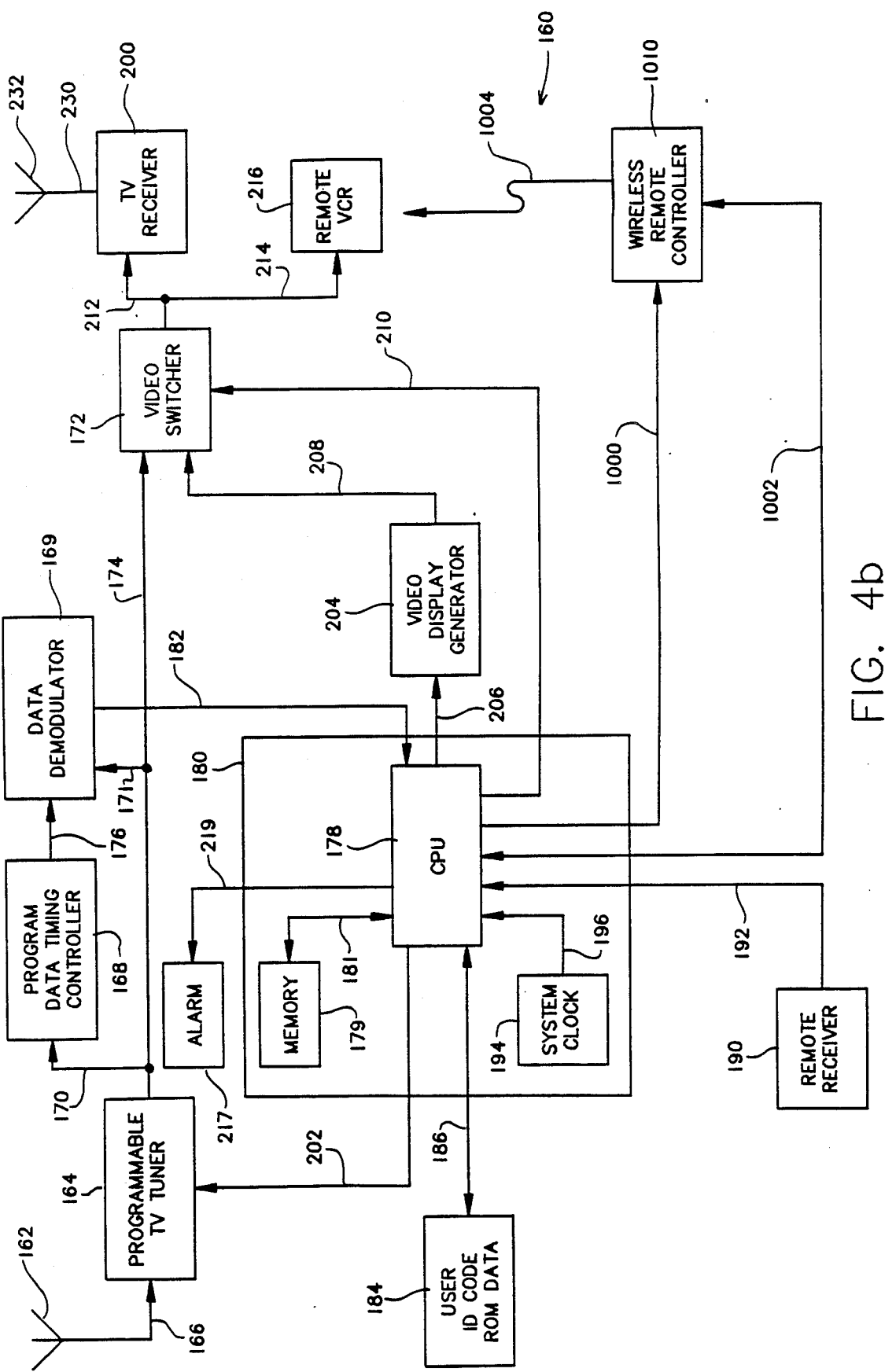
FIG. 4B is a block diagram of a modified form of the system in FIG. 4, which also is used with the transmitter of FIG. 2.

FIG. 4B is a block diagram of a modified form of the receiver 160, which may also be used with the transmitter system 50 shown in FIG. 2. In the FIG. 4B receiver 160, a remote VCR 216 and its wireless remote controller 1010, so that the remote VCR 216 need not be powered up in advance of unattended recording. The remote controller 1010 is connected by lines 1000 and 1002 to CPU 178. In response to the CPU 178, the remote controller 1010 transmits control signals to the remote VCR 216 in a conventional manner, as indicated at 1004. The remote controller 1010 can be either a unit designed for the VCR, but modified to be electrically operated from the TV scheduler, or it can be an equivalent design of the remote controller with direct connections to the CPU 178. Instead of enabling the VCR from the pause line 214, when the CPU 178 determines that a program is to be recorded (see, e.g., block 501 of FIG. 13) according to the selected programs, it issues a control signal to power up the VCR on control line 1000. This control signal generates a contact closure across the switch matrix of the remote controller 1010 power-on key. The contact closure may be obtained with a relay or an FET transistor switch. The control signal on line 1000 also generates a contact closure across the play key and the record key of the controller 1010 to initiate recording of the program. When the program ends, CPU 178 will issue a control signal on line 1002. Line 1002 generates a contact closure across the remote controller power-off key. When the CPU 178 determines another program is to be recorded, the above process is repeated.

In order to carry out background recording of a program while watching another program on the TV receiver 200, line 212 is connected to the AUX input of the TV set 200. To receive a normal broadcast while using the TV scheduler to record TV programs in the background, the I; AUX input switch is set to connect antenna 232 to the TV receiver 200. The VCR 216 can now record the scheduled programs without interfering with normal TV viewing.

2. Summary of Keyboard Operation

Figure 5:
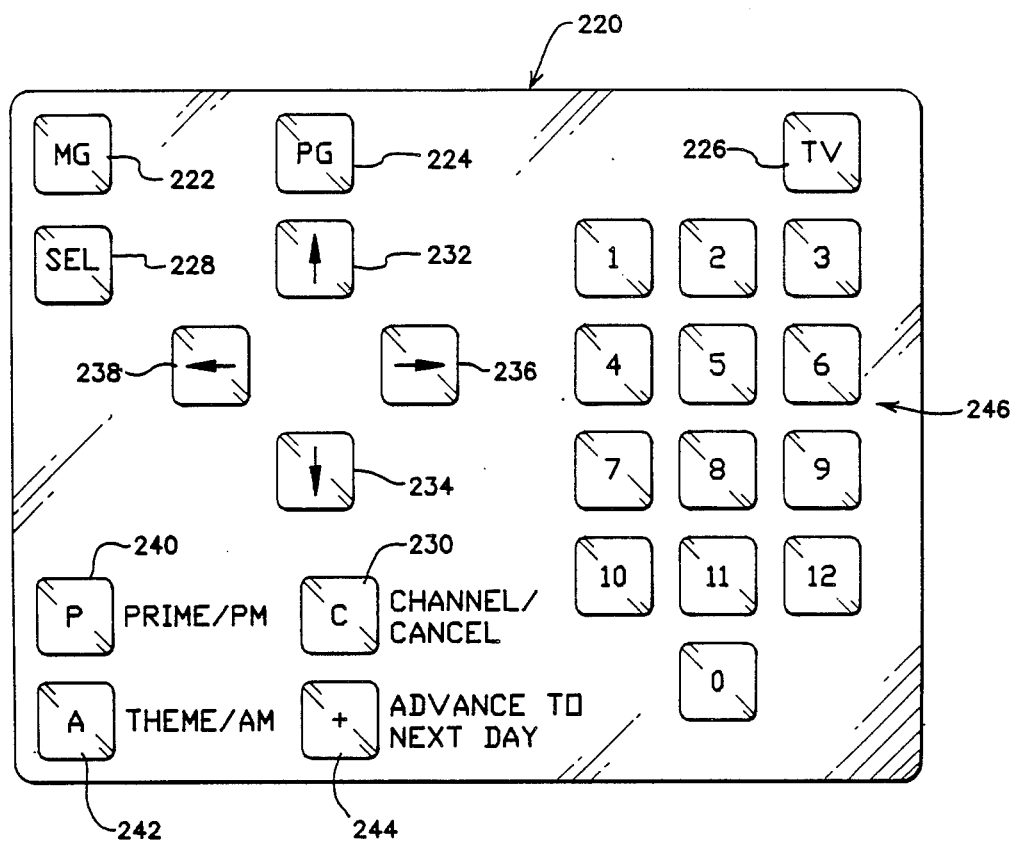
FIG. 5 is a plan view of a control panel used in the systems of FIGS. 3–4.

FIG. 5 shows the layout of keyboard 220 used in the remote control transmitters 116 and 188 of FIGS. 3 and 4. The keys 222-244 have the following significance:

MG 222: Master Guide for direct listing and immediate selection of program.
PG 224: Program Guide for setting up stored features and accessing help information.
TV 226: Selects conventional channel selection.
SEL 228: Selects program from menu to be displayed on TV
C 230: Cancels stored program in the PG mode; toggles channel restriction on and off in the MG mode.
↑ 232: Moves pointer to top of listing; auto scrolls to previous page if pressed when pointer is on top line.
↓ 234: Moves pointer to bottom of listing; auto scrolls to next page if pressed when pointer is on bottom line.
→236: Moves to next page; pointer location unchanged. Wraps to start of week listing when last page is displayed.
←238: Moves to previous page; pointer unchanged. Wraps to end of week if listing is already at start.
P 240: If not preceded by a numeric key, P will restrict listing to prime time only. If entered after a numeric key, P indicates PM.
A 242: If not preceded by a numeric key, A will restrict listing to selected themes only. If after a numeric key, A will indicate AM.
244: Advances to the next day, hour unchanged. Wraps around by days of the week.

MG Master Guide Mode

This mode allows direct selection of a program from the listing. For the average user, the Master Guide (MG) mode is the only mode used. To access the MG mode, press the MG key 222 once: to exit mode, press the MG key 222 a second time, or use the SEL key 228 if the pointer is positioned at the desired program.

The keyboard 220 may be used as a conventional TV selector by pressing the digit keys only, when the TV scheduler 160 is in the manual mode after the TV key is pressed. When used as a manual channel selector, each time that a new channel is selected, a channel number will appear on the bottom line of the screen. If a service name is associated with a signal received on a particular channel, the channel name will be displayed, rather than the channel number. Thus, if channel 3 is HBO, HBO will be displayed. Each time a channel is selected, a channel number or channel name, the name of the program, how long the program has been on, and how long remains for the program will appear on the bottom lines of the screen. For example, when the user scans the channel, it will show:

| HBO | Prizzi's Honor | on for 55 minutes |
| | | end in 35 minutes |

Alternatively, the time that the show has been on and the time remaining could be shown graphically with, for example, a horizontal split bar graph. This approach can also be used when scanning program listings in the case of programs in progress at the time of the scanning.

The following is a typical screen when the MG key 222 is pressed. Listing always starts at the nearest previous half-hour. Note that the pointer always is positioned at the last selection made (Wall Street Week, in this example.)

| 9:00 | Hotel series | Ch 7 |
| | News | Ch 2 |
| | Wall Street Week | Ch 17 |
| | Movie | F2, Ch 20 |
| 9:15 | Movie | HBO |
| 9:30 | Streets of SF | Ch 2 |
| Wed. Jun 30, Prime: 6 pm 11 pm, theme 2 on | | |
| Time: 9:23 PM Channel group 2 on Time | | |
| remaining: 7min., Wall Street Week | | |

Note that screen will list 16 lines of program information not including the three status lines at the bottom of the screen. The time remaining could also be shown directly in the 16 lines of program information in the case of programs in progress. The designation "F2" is a satellite name. As shown, Prime indicates that the listing is restricted to hours between 6 pm and 11 pm. Theme 2 on indicates that theme group 2 is selected. Up to 4 groups of theme selection are available to accommodate 4 viewers. Channel group 2 restricts listing to channels defined under group 2. Four different channel groups are provided to accommodate different viewers. Up to 5 characters are available to indicate a program service by name.

Keys most commonly used in the MG mode. A complete detailed explanation follows:

| | |
|---|---|
| UP 232, DOWN 234 | moves pointer up or down |
| −> 236 | moves one page forward |
| <− 238 | moves one page backward |
| + 244 | moves one day forward, hour unchanged. Wraps around when last day of week is reached. |
| SEL 228 | go to selected program (marked by pointer) |
| TV 226 | go to conventional manual channel selection |
| Digits 246 | used to set start time of search, else start of search will be at the nearest hour |
| Keys used by advanced users: | |
| C 230 | Toggles channel listing restriction |
| P 240 | Toggles prime time listing or sets PM |
| A 242 | Toggles theme listing or sets AM |

3. Detailed Operation in the MG mode When the MG key 222 is pressed, the TV screen will display a listing of programs starting at the nearest full hour. For example, if the time is 2:17, the display will start at 2:00. If desired, the user can enter the hour when the listing will start. For example, if 5 is entered, the listing will start at 5. Note that there is no need to enter an explicit AM or PM if the current AM or PM is same as the desired listing time. At the bottom of the screen is a two line status display, showing the actual time and date, and whether any of the search restrictions (prime, theme, and channel) are activated. If the prime is on, the prime time will limit the program listing to the prime time (specified by the user in the PG mode). If the start time is set to 6 pm, when the MG key 222 is pressed, the listing will start at 6 pm if the current time is 6 pm or earlier. If the current time is 9:05 pm, and the prime start time is 6 pm, then the listing will start at 9 pm, since a listing starting at 6 pm is not particularly useful.

Note that the user can override the prime time restriction by entering an hour digit at any time. The listing will immediately start at the override time. Also note that for the average user, the prime time need not be set. It is set to 6 pm to 11 pm by default when the Program Master is first used.

The cursor keys 232-236 can be used to select a different program. The up/down cursor keys 232-234 will move the cursor one line up or one line down at a time. When the top or the bottom of the listing is reached, the up key 234 will cause the screen to automatically display a previous one page, while the down key will cause the screen to display the next page.

To speed up listing, the left and right arrow page keys 238 and 236 may be used to go back or advance a page at a time, respectively. The cursor position is unchanged when the page keys 236-238 are used.

Once a desired program is indicated by the cursor, pressing the SEL key 228 will automatically cause the Program Master to return to the TV broadcast with the channel tuned to the selected program. The MG key 222 may also be used to return to the TV program, prior to selection in the MG mode. If the TV key 226 is pressed, the TV will return to the last manually selected program. By toggling between the MG and the TV modes, it is possible to review two programs without having to remember the channel numbers.

Example of MG Mode

To start listing at 2 pm, press the following keys:
MG 222, 2 digit key 246, P 240, SEL 228

The TV will immediately display the program next to the pointer when the SEL key 228 is pressed.

Pressing the P key 240 is optional; if omitted, the listing will be the same as the current PM or AM.

4. Program Guide (PG) Modes

For advanced users, the Program Master can be set up to list only the types of program (theme), only certain channels and only programs within a certain time, such as Prime Time. In addition, the Program Master can store weekly programs and special programs. The stored program can be used to trigger an alarm or enable a VCR without user intervention. The PG mode may be used for unattended recording of a series of programs by only menu selection, without the user having to set the VCR with channel, time, date, or length of program.

Note that the Program Master can be used without setting up any of these features. However, much of the power of the Program Master is contained in these features The PG modes are infrequently used by the average user. For advanced users, the PG modes may be re-programmed daily.

There are five sub-modes available when the PG key 224 is pressed. Each of these modes allows the user to customize the program listing. When the PG key 224 is first pressed, the following information is displayed at the bottom of the screen:

| | |
|---|---|
| PG A | selects the theme setup mode |
| PG P | selects the prime time hours setup mode |
| PG C | selects the restrict channel listing setup mode |
| PG + | selects the weekly/special selection setup mode |

PG A Theme Setup

When the A key 242 is pressed, a list of themes appears on the screen. The Up/Down keys 232-234 may be used to position the selection cursor next to the theme to be added to the list. The SEL key 228 is used to add to the list while the C key 230 can be used to cancel a selected theme. As each theme is selected, the cursor is enhanced by a marker identifying the themes selected. There can be up to 31 themes displayed on two pages.

Some themes, such as sports, have up to 15 sub-themes Whenever the cursor is placed alongside a theme with sub-categories, an expanded listing appears on the right of the screen. These sub-themes may be accessed using the two left/right arrow keys 238 and 236 (used for page selection in the MG mode). When the right arrow key 236 is pressed the cursor will reposition to the top of the sub-themes. One or more sub-themes can be selected using the SEL key 228 or eliminated using the C key 230. To return to the main themes, the left arrow key 238 is pressed. Alternatively, by pressing the MG key 222, the MG mode can be accessed directly. The selection made while in the PG A mode will be permanently stored.

The PG key 224 is generally ignored while in the PG mode. However, while in the sub-theme listing, the PG key 224 will return to the main theme listing. A typical theme listing is shown:

| | |
|---|---|
| News | Football |
| Movies | Baseball |
| Sports (2) < | *Basketball |
| Childrens Show | Golf |
| Education and Science | Tennis |
| Financial News | Bowling |
| *Special Series (4) | *Racing |
| Travel | Boating |
| Foreign Language | Hunting |
| Game Show | Special Events |
| *Re-runs (ALL) | |
| Music | |
| Theme Group 2   Total no. of themes: 3 | |
| Total no of groups setup: 3 | |

To accommodate several viewers with different theme interests, the Program Master has the facility to create up to four theme lists. To create a multiple list, after PG A is entered, enter a digit (from 1 to 4) immediately. To create another list, the user must exit the PG mode and re-enter PG A with a new digit. Note that when the user creates a numbered list, the Program Master still provides a default mode where all programs are listed (theme off mode). If no numbered list is created, the Program Master provides only two modes: theme off and theme on. Again, for the average user, this is the most common setup of the theme mode.

When the MG mode screen is displayed, the theme indicator at the bottom of the screen will list the current theme number if a numbered theme list exists. Each time the A key 242 is pressed, the theme number advances to the next theme number. For example, if there are two lists, theme 2 and theme 4, each time the A key 242 is pressed, the display shows theme 2, then theme 4, then no theme (theme off), and then back to theme 2.

The Program Master will remember the last theme setting when the Program Master is turned off, and will automatically be set to this mode when the MG key 222 is pressed.

Next to each main theme with selected sub-themes is a number indicating the number of sub-themes selected. If no sub-theme is selected, the Program Master assumes that all the sub-themes are to be displayed. In this case, the indicator will be ALL.

A sub-theme can be deleted using the C (cancel) key 230 with the cursor pointed at the sub-theme. It is possible to cancel all sub-themes by simply cancelling the main theme, using the same cursor key 232-234/C key 230 procedure.

The status lines give a summary of themes selected. Note that since the themes are listed on two pages, the summary gives the user some indication of activity of the second page.

PG P Prime Time Setup

This feature allows the user to set up the prime time schedule for restricting the listing to only programs falling within the prime time. When the MG mode is accessed, at the bottom of the screen is a status line indicating if the prime time only listing is on or off. By default, if the user does not set the prime time, the prime time is automatically set to 6 pm and 11 pm. There is only one prime time schedule for all viewers.

| |
|---|
| Enter start time: ___ (hour and A or P) |
| Enter end time: ___ |
| Current Prime Time is set to: 7 pm - 1 am |
| Press MG, PG again, or TV to exit this mode |
| Only the MG key will cause the prime time to be modified |

To enter the start and end time, the user keys in a digit key 246 followed by the A key 240 or the P key 242, indicating AM or PM. If no change is required of the start time, the user can skip to the end time by pressing the SEL key 228. Pressing the SEL key 228 twice will automatically exit the display back to the MG mode.

After a new time has been set, the current prime time on the status line will be changed the next time the user accesses the Prime Time mode. Pressing the TV key 226 or the PG key 224 will inhibit updating of the prime time. Only the MG key 222 will cause the prime time to be modified and stored.

Prime time, when activated, will restrict listing to the specified hours. In addition, if the current time is inside the prime time, the start of listing will be the nearest hour of the current time. For example, if the prime time is set from 7 pm to 11 pm, and the current time is 9:34, then the listing will start at 9:00 pm.

If the day command (+ key 244) is activated, the listing for the next day will always start at the beginning of prime time (7 pm in the above example) for the next day.

When the last hour specified by prime time is reached, the listing will wrap back to the start of prime time and will not advance to the next day.

PG C Channel Restriction List Setup This feature allows the user to restrict listing to the channels of interest, and also the satellite if it is a satellite broadcast. As in the case of themes, up to four different channel groups can be set up to accommodate different viewers. Alternatively, one of the list can be set up for just one or two channels of interest. To create a simple list, enter PG C. The following screen will appear;

| |
|---|
| A. Enter channels or satellite name/symbol to be listed: ___ |
| B. Enter channels or satellite name/symbol not to be listed: ___ |
| Note that only one of the above is allowed. |
| Changing from one to another will automatically delete channels of the other list. |
| Current channels listed: 2, 4, 5, 6, 7, 8, 9, 12, 22 |
| Press MG, PG again, or TV to exit this mode. |
| Only MG will cause the changes to be updated. |

To enter channels, press the digit keys 246 and enter using the SEL key 228. All single digit channels must be preceded by O. A channel can be removed from the list by using the paging keys 236-238 to position a marker under the channel number to be deleted under the channel number or channel name to be deleted. Similarly, if satellite listing service is requested, satellite names will be listed. Satellites, as well as channels, can also be deleted from the listing using the C key 230. The C key 230 will activate the deletion. Each time a channel is deleted, the marker will advance to the next position to the right of the deleted channel.

When the channel selections are completed, the MG key 222 must be entered to store the changes. When the PG C mode is accessed again, the current channel listing will reflect the new changes.

Note that in many cases, the channel not to be listed is a much shorter list and therefore preferred over the to be listed list. The status line will indicate either the channels listed or channels not listed as entered by the user.

To create multiple lists, follow the PG C entry with a number from 1 to 4. Any other number will display a help screen. When MG is entered, the status will show Channel Group n instead of simply Channel ON or OFF for a single restriction list. There is always a default channel mode where all channels are listed. While in the MG mode, each time the C key is pressed, the Channel Group number is changed. If there are no more Group numbers, then the default channel mode is displayed.

PG+Schedule Setup

This mode allows the user to create a weekly reminder calendar, typically for weekly series and special events of non-weekly programs. The reminder process will set an alarm if the TV is not on before a certain time before the start of the program. If the TV is not on when the program starts, the reminder process will turn on the VCR to start recording the program.

The schedule may be programmed to respond to either a single program of a series or all programs of a series. For example, a daily or weekly show may be scheduled for a particular day or for all occurrences in the program listing.

The Program Master will automatically link and schedule all programs of a series using a linking code assigned to all programs of a series by the broadcaster. For example, the NBA playoff series which occurs at an irregular time and interval may be completely scheduled just by selecting the NBA listing and assigning an ALL suffix to the listing. At the end of the series, the listing is automatically revised with the suffix, OLD. After one week, the listing will automatically be deleted, if the user has not already deleted it. If a program selection is not followed by the A key 242, the program is assumed to be one time only. The A key 242 can be pressed at any time to affect ALL responses.

When the schedule mode is entered, a split screen displays the scheduled program on the top eight lines and the program list on the bottom eight lines. This listing is identical to the MG listing, except that a shortened listing is displayed instead of 16. All other MG parameters, such as Prime, Channel, and Theme are in effect. The user should review the MG status before setting up the schedule. Up to 16 programs can be entered in the schedule listing using two pages of display. The page keys 232 and 234 are used to access the second page. Either the up or down keys 232 and 234 will toggle the schedule listing.

A typical schedule is shown below:

| | | |
|---|---|---|
| Hotel (ALL) | Fri 9 pm | ch 7 |
| Dynasty (ALL) | Wed 8:30 pm | ch 4 |
| Simon and Simon (ONLY) | Mon. 10 pm | ch 2 |
| 7:30 News | | ch 2 |
| Evening | | ch 4 |
| Movie: Prizzi's Honor | | SHO |
| Movie: 2001 | | AD, ch 19 |
| 8:00 Masterpiece Theater | | |

Wed Jun 30 5:34 pm Schedule Page 1 (status line)
Use A to enter ALL; press A again to toggle back to ONLY The cursor and page keys 232–238 operation is identical to the MG mode except the range is restricted to either the upper or lower half of the display. If the cursor points to the top of the program listing (line 9), the listing will scroll down a half page (eight lines). If the cursor points to the bottom of the schedule (line 8), the schedule will shift to the next page. To cross from schedule to program list, and vice versa, the P key is used. The cursor will reposition itself to the top of the new selection.

In the lower listing, the +key 244 operates as in the MG mode, advancing the listing by one day at a time. In the upper screen, the + key 244 has no effect.

To add a program to the schedule, use the P key 240 to toggle the cursor to the program listing (lower half of display). Use the cursor, page, or + keys 232–234, 236–238 or 244 to locate the desired program. Use the SEL key 228 to store the program in the schedule. The upper screen will immediately display the new addition. If the page is full, the Program Master will automatically switch to the next page. If both pages are full, the status line will show a FULL message.

To cancel a scheduled program, either to make a correction or make room for a new addition, use the P key 240 to switch to the upper display. Position the cursor to the program to be deleted, using the up/down or page keys 232–238. Press the C key 230 to cancel the program.

All changes to the schedule are effective upon pressing SEL or C, and do not require the MG key 222 to initiate update. To exit, use the MG or TV key 222 or 226.

During attended operation, when a scheduled program is activated, the name of the program will be superimposed onto the TV screen as a subtitle when the TV is first turned on. Pressing the TV key 226 will clear the subtitle. During an unattended operation, no name will be superimposed onto the screen, so that VCR recording will not be disturbed.

5. Flow Diagram Description

The following is a description of the program sequences for the CPU 110 in FIG. 3 or the CPU 178 in FIG. 4.

Figure 6:
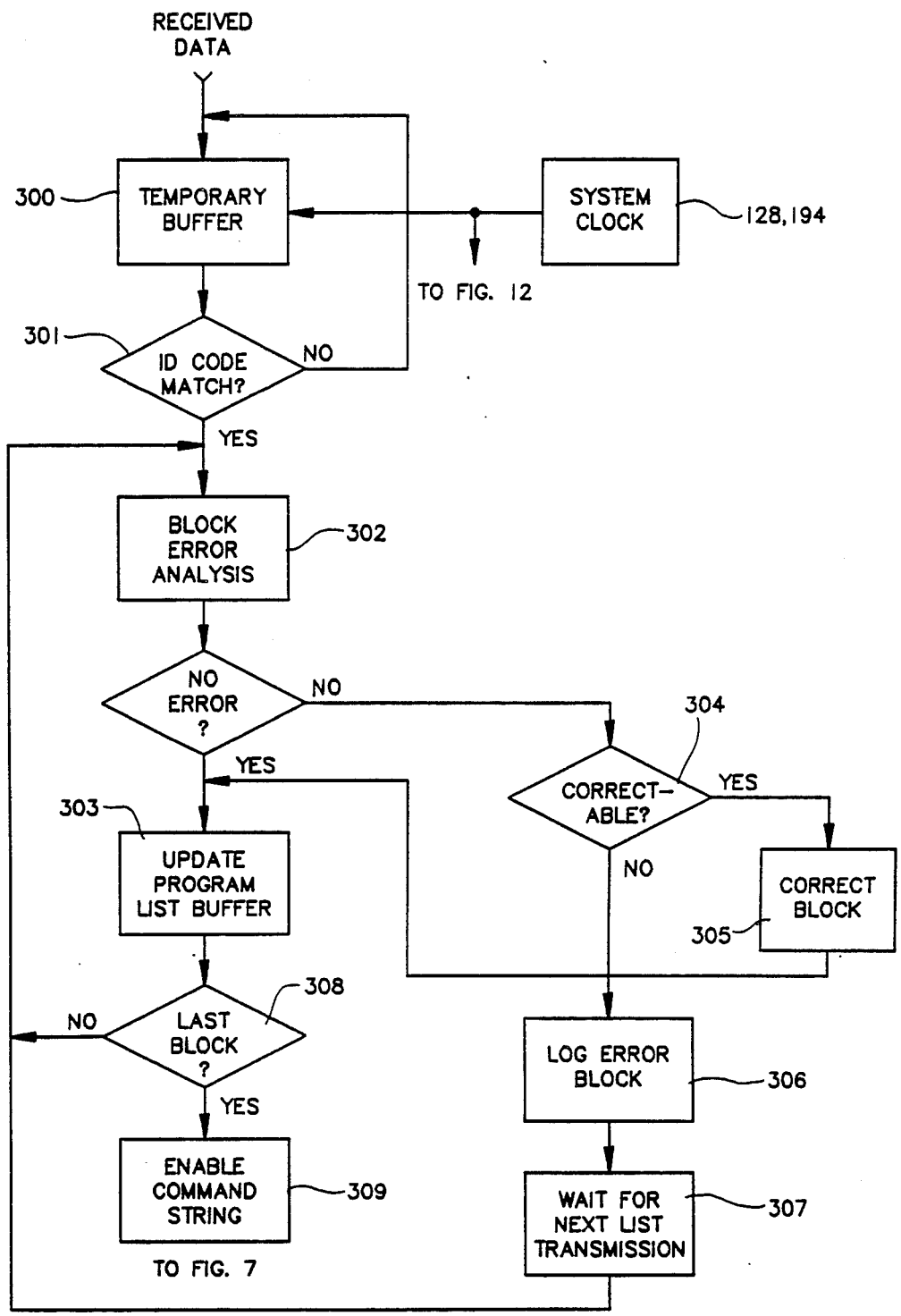

Received data from data demodulator 102, FIG. 3 or data demodulator 169, FIG. 4, is stored in temporary buffer 300 of FIG. 6. The buffer is enabled by the system clock 128, FIG. 3 or 194, FIG. 4 during down time of the broadcast. In another implementation, the buffer 300 is always enabled. The ID of the subscriber in ROM 112 of FIG. 3 or ROM 184 of FIG. 4 is compared with the received data, by decision block 301 of FIG. 6. If a match is found, the Program Master is ready to receive programming data. In another implementation, no ID match is required to receive the programming data.

As each block of data is received, the data integrity is verified by error checking logic at 302. If no error exists, the received data is stored in the program list buffer 303, replacing the previous program list data. If an error exists and is determined to be correctable at 304, the block is corrected at 305 and then stored in the program list buffer 303. The block error analysis 302 is based on cyclic redundancy coding to correct errors that affect short burst errors in a known manner.

If the error is determined to be uncorrectable, the number of the uncorrectable block is logged in an error log 306. The receiver is set by 307 in this case to wait for another complete transmission before terminating the program update. The microcomputer 22 of FIGS. 1 and 2 is programmed to repeat transmissions of the program list for a number of times to allow for correction of uncorrectable errors at the receiver 90 or 160 (FIGS. 3 and 4).

When the last decision block 308 detects a last block command in the transmission, update of the program listing is terminated. The CPU passes control at 309 to the command string processor 310, FIG. 7.

The command string 310 searches for closure of the MG key 222 (FIG. 5) at 320, the PG key 224 at 321, or the TV key 226 at 322. If any other keys are entered before one of these keys, the key is ignored. If the TV key 226 is entered, the manual TV channel select mode is set up at 323. The Program Guide then functions as a standard remote TV tuner.

When a channel is changed at 323, the channel number or name is inserted into the lower half of the screen for a few seconds. Video switcher 172 (FIG. 4) is controlled by line 210. When the TV frame reaches the bottom half of the screen, line 210 selects the video display generator 204 instead of the programmable TV tuner 164 as its input. The timing to actuate line 210 is derived from the program data timing controller 168 and is inputted to the CPU 178 by the data demodulator 169 output line 182. Other implementations are possible, such as insertion of the channel number or name into the video picture.

Figure 8:
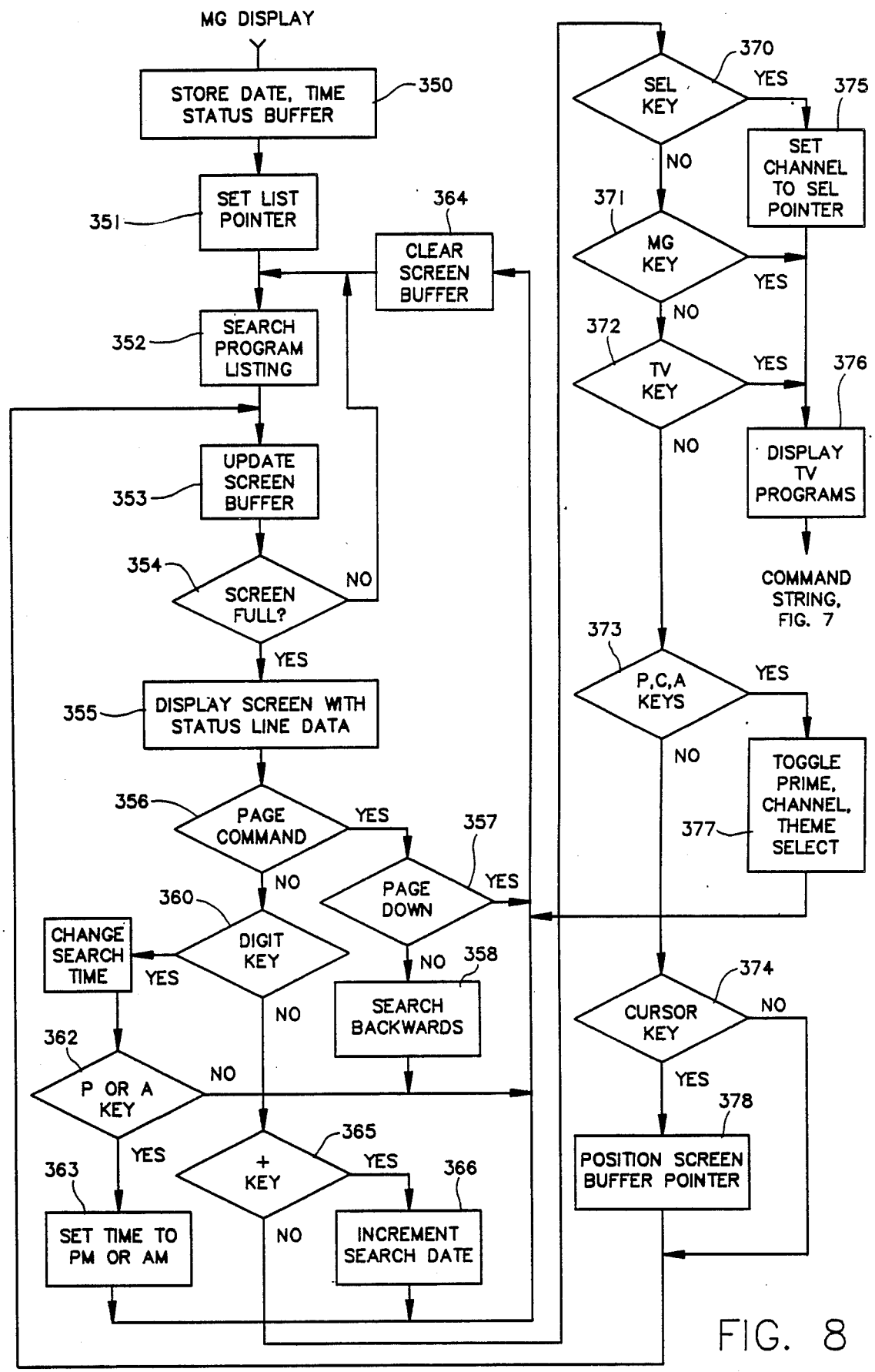
Figure 11:
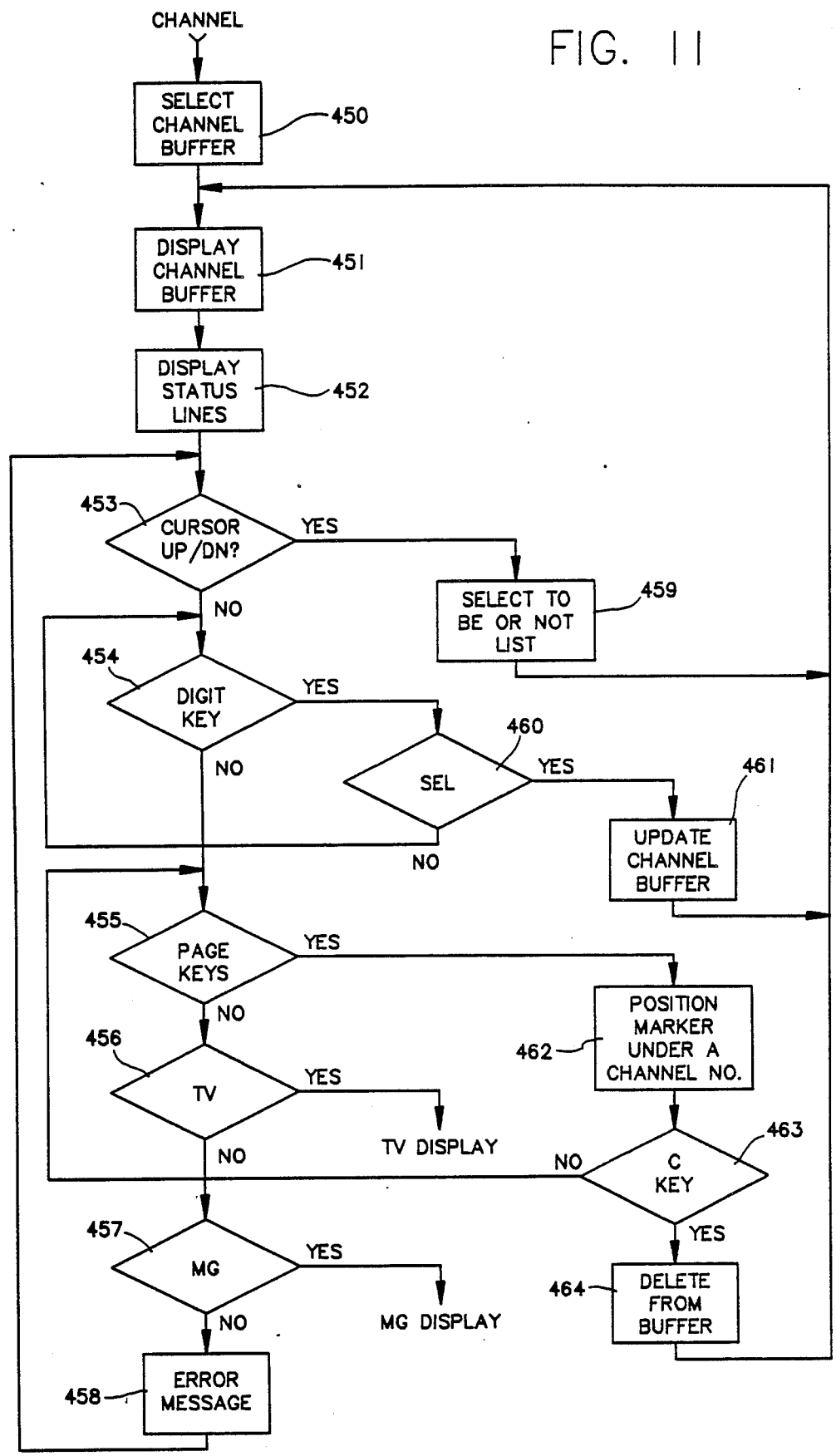
Figure 12:
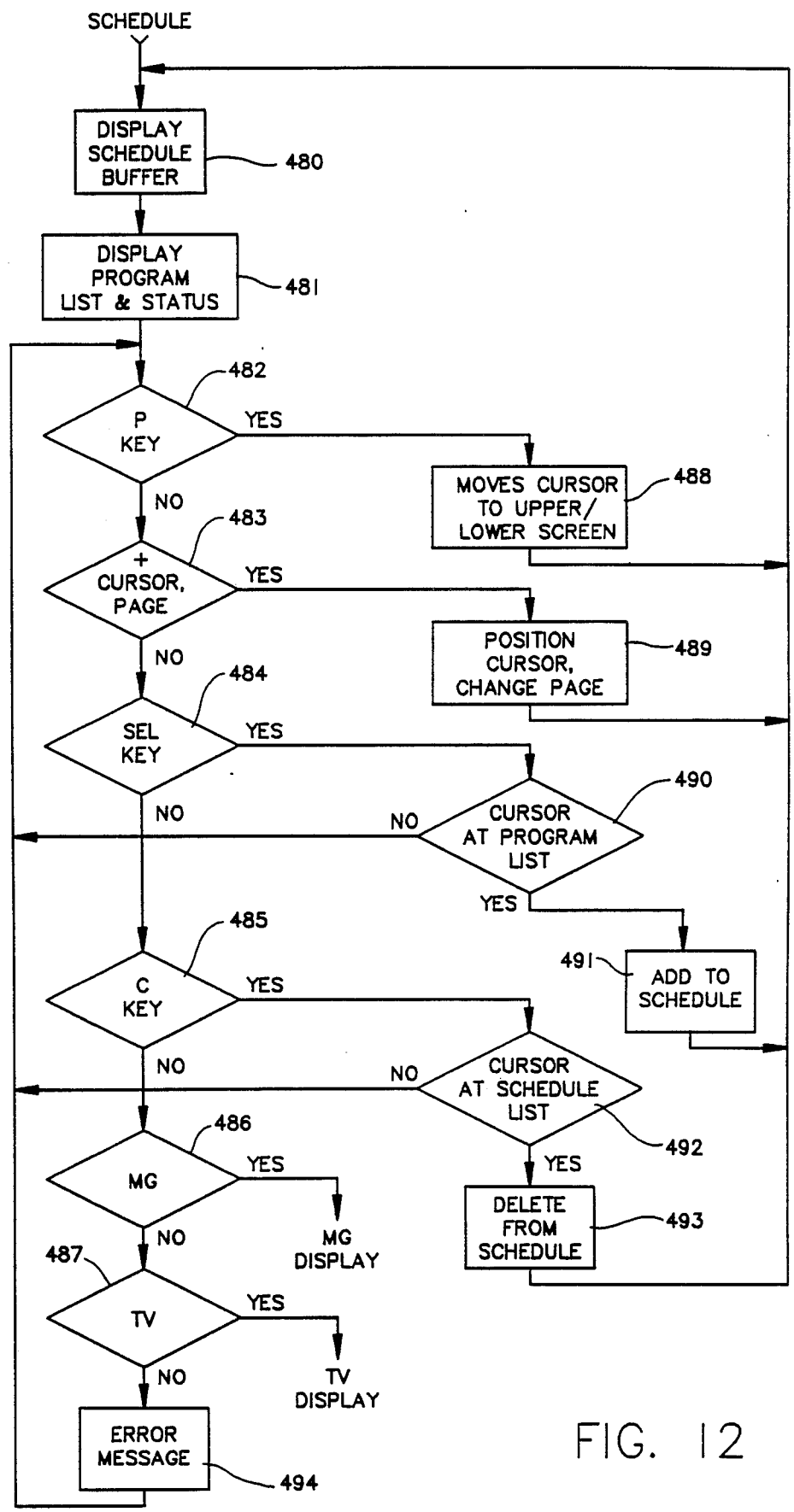

If the MG key 222 is entered, the MG mode is selected, FIG. 8. Upon entry, the system clock time and calendar is stored in the status line buffer 350. The set list pointer 351 is adjusted to the nearest hour based on the current time and date.

A search of the program listing 352 is made. The search is dependent on the status of the channel buffer, the theme buffer, the prime time buffer, and the direction of search. If the page 356 is up, the search direction is forward starting from the list pointer. If the page is down 357, the search direction will be backward 358 from the current list pointer. When the search satisfies the above criteria, the program listing is placed into the screen buffer 353. The search continues until the screen buffer is full 354 in which case the search is terminated. The status lines information is passed to the screen buffer and displayed 355 by the TV.

The CPU 110 (FIG. 3) or 178 (FIG. 5) selects the screen buffer to drive the video display generator 136 (FIG. 3) or 204 (FIG. 4), and also operates the video switcher 140 (FIG. 3) or 172 (FIG. 4) to switch the TV 126 (FIG. 3) or 200 (FIG. 4) from the programmable TV tuner 132 (FIG. 3) or 164 (FIG. 4) to the generator 136 or 204.

If a digit key 246 (FIG. 5) is detected at 360, the search time is changed to agree with the digit entered at 363. If the P or A key is detected at 362, the PM or AM of the time will be changed accordingly. The screen buffer is cleared at 364 and a new search is started with the list pointer set to the new search time.

If a + key 244 entry is detected at 365, the search date is incremented at 366, the screen buffer is cleared 364 and a new search is started with the list pointer set to the next day. The increment search date at 366 will return the start of listing date if incrementing will go beyond the last date of the programming listing.

If an SEL key entry is detected at 370, the channel of the programmable tuner 132 or 164 will be set to the channel listed at 375 at the current cursor position of the MG display. The MG mode is terminated at 376 and the TV 126 or 200 is switched by the video switcher 140 or 172 to the tuner 132 or 164.

If an MG key 222 entry is detected at 371, the MG mode is terminated at 176 and the TV 126 or 200 is switched to the channel that was set in the programmable tuner 132 or 164 before the MG mode was activated.

If a P, C or A key 240, 230 or 242 closure is detected at 373, the prime buffer, channel buffer and theme buffer are toggled off or on at 377. The screen buffer is cleared at 364, and a new search is commenced with one of the search criteria changed.

If a cursor key 232 or 234 closure is detected at 374, the screen cursor will be positioned up or down at 378 corresponding to the up or down cursor. The screen buffer is updated at 353 to reflect the new cursor position.

Figure 7:
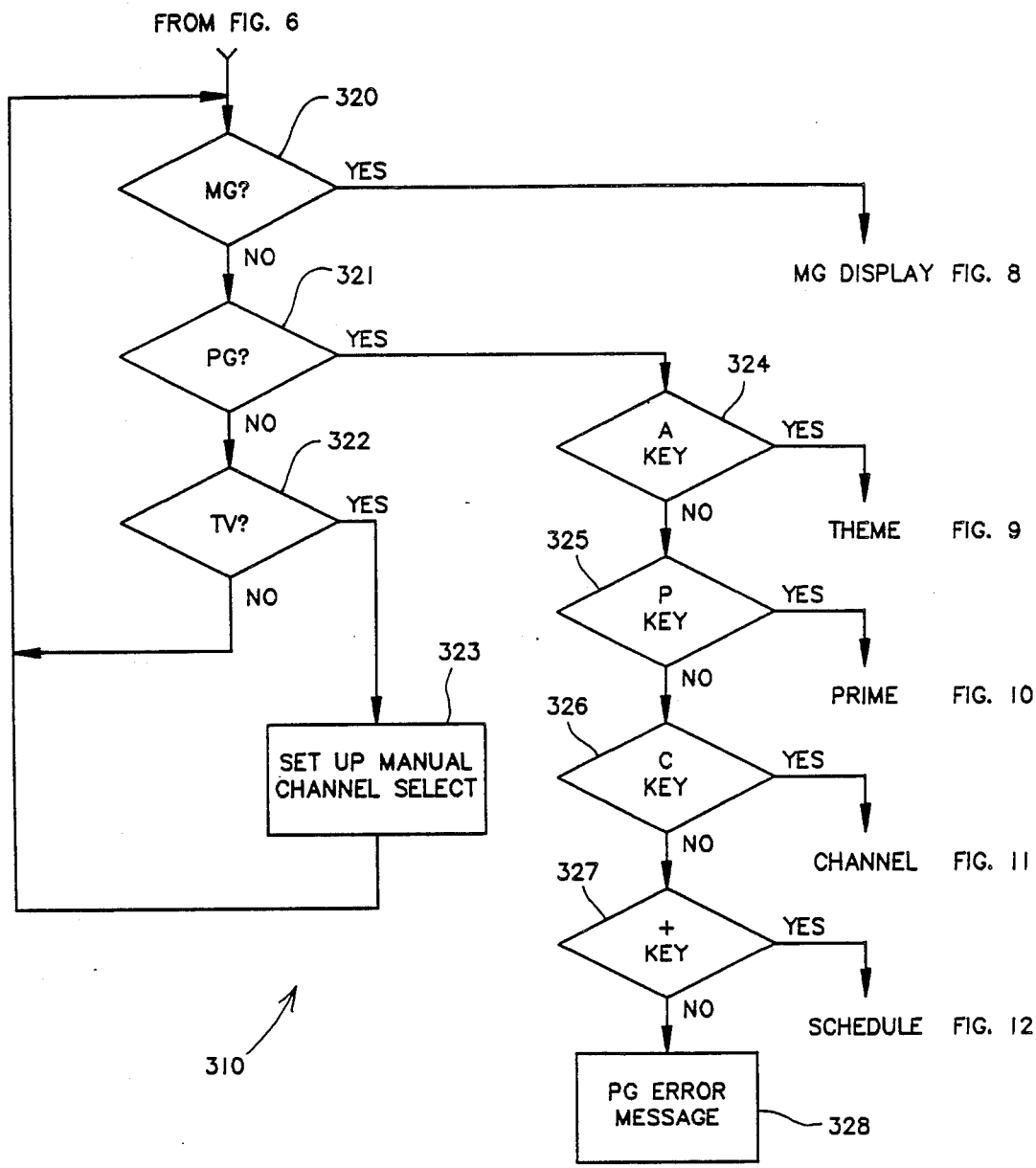

Referring to the flow diagram of FIG. 7, if closure of the PG key 224 is detected at 321, followed by closure of the A key 242 at 324, the theme mode is selected. Referring to FIG. 9, the theme buffer 400 is selected by the CPU 110 or 178 to output to the video generator 136 or 204 and displayed on the TV 126 or 200, as indicated at 401. The theme buffer data originates from the received program list data. The themes may change over time as new themes are presented. The status line information is also displayed on the TV 126 or 200, as indicated at 402. The status line indicates the current PG mode, theme, time, date and also shows the number of selected themes.

If a cursor key 232–234 closure is detected at 403, the cursor position is moved up or down one listing at 409 and the display is updated at 401. If an SEL key 228 closure is detected at 404, the listing pointed by the cursor is annotated at 410 and displayed as an asterisk next to the listing.

If a C key 230 closure is detected at 405, any annotated theme pointed to by the cursor is deleted at 411. If the theme is not annotated, the C key 230 is ignored.

Each time a theme is selected or deleted, the number of themes selected is determined and the status line updated at 402 to reflect the current status.

If entry of the digits 1, 2, 3 or 4 keys 246 is detected at 406, a new theme buffer is selected at 412 and displayed at 401.

If an MG key 222 closure is detected at 407, the screen is cleared and replaced by the MG mode, FIG. 7. If a TV key 226 closure is detected at 408, the display is replaced by the TV program selected by the programmable tuner 132 or 164 prior to the theme mode.

If a key is detected other than any of the above, an error message is placed in the status line field at 413 indicating the keys allowed.

Prime

Referring to FIG. 7, if a P key closure is detected at 325, the prime time mode is selected. Referring to the prime time flow chart, FIG. 10, the prime time buffer is selected and displayed at 420. The status information for the prime mode is also displayed at 421.

The prime time entry mode is set up to input the start time at 422. If a digit key 246 is detected at 423, followed by either the A or P key 242 or 240, indicating AM or PM respectively, the digit and am or pm is stored at 428 in the prime screen buffer. If neither A or P is detected, the SEL decision block 424 determines whether the SEL key 228 has been entered. If the SEL key 228 is detected, the prime screen buffer will accept the digit and store it at 428 with an implied am or pm based on the previous am or pm selection.

When an input is accepted, the entry mode changes from the start time to the end time at 429. The end entry sequence is the same as the start, except when the screen is updated, the prime mode exits to the MG display. The new prime time is now displayed on the MG status line.

If none of SEL, A or P 228, 242, 240 are detected at 424, and the key closure is not MG 222 or TV 226, as detected at 426 and 427, then a prime mode error message is displayed at 430. The message is inserted into the status line indicating the valid keys that can be entered.

If the MG or TV key 222 or 226 is detected, the result is the same as for the theme mode.

Channel

Referring to the command string flow diagram, FIG. 7, the channel mode is selected if the C key 230 is detected at 326. Referring to the channel flow diagram, FIG. 11, the channel screen buffer 450 is selected by the CPU 110 or 178 to be displayed at 451 on the TV 126 or 200.

Status information for the channel mode is displayed at 452 with the channel information. If the cursor keys 232-234 are detected at 453, the entry list switches from channels to be displayed to channels not to be displayed at 459.

If a digit key 246 is detected at 454, the CPU 110 or 178 waits for an SEL key 228 entry at 460 to enter the data into the channel screen buffer at 461.

If a page key 236-238 is detected at 455, an underline marker will be positioned under the first channel number entry at 462. If the following key is a C (cancel) key 230, detected at 463, the underlined channel will be deleted from the channel screen buffer at 464. If it is not a C key 230, the CPU 110 or 178 will wait for another key at 455. If another page key 236-238 is entered, the underline will move to the next channel number listed at 462. Thus the page keys 236-238 may be used to point at a channel to be deleted.

If an invalid key is entered (none of the above keys, MG 222 or TV 226, tested at 456 and 457 respectively), an error message for the channel mode will be displayed on the status line at 458 indicating the required valid keys.

Referring again to the command string flow diagram, FIG. 7, if the + key 244 is detected at 327, the schedule mode is selected. Referring to the schedule flow diagram, FIG. 12, the CPU 110 or 178 selects the schedule screen buffer to be displayed on TV 126 or 200 when the schedule mode is enabled. The schedule is presented on the upper half of the screen at 480.

The program listing is presented on the lower half of the screen at 481. The remaining time for each listed program is computed by referencing against the current time and the length of program time. If the P key 240 is detected at 482, the cursor moves from the listing section to the schedule section of the screen. The P key 240 is used to toggle the cursor between the two sections at 488.

If a cursor key 232-234 is detected at 483, the cursor will be positioned at 489 a line at a time as in the MG display. However, instead of causing the screen to scroll when the cursor reaches the bottom of the screen, scrolling starts when the cursor attempts to cross the middle of the screen, that is, cross into the other section of the display.

If a page key 236-238 is detected at 483, the section with the cursor will scroll at 489 forward or backward depending on the page direction.

If the SEL key 228 is detected at 484, and if the cursor is located in the program list section at 490, the listing pointed to by the cursor will be computed for non-conflict with existing listing. If the desired new listing schedule overlaps or conflicts with the existing listing, a warning message will appear in the status line field. The user is required to enter the SEL key 228 a second time to update the schedule. If the warning message is ignored, the latter entry will not be supported for purposes of unattended VCR operation. Thus, the user is informed of a possible error before unattended recording is started.

When the SEL key 228 is entered, the selected list is copied to the end of the schedule section at 491. If the schedule section is full, the status line will indicate that a schedule listing must be deleted to make room for the new listing. When a list is changed, the display is updated at 480.

If the C key 230 is detected at 485, and if the cursor is located in the schedule list section, determined at 492, the listing pointed to by the cursor will be removed at 493 and the remaining listings will be shifted forward by one listing to fill the gap left by the deleted listing.

If the key is MG 222 or TV 226, as determined at 486 and 487 the result is the same as for the theme mode discussed above.

If an invalid key is entered, a schedule error message will appear in the status line at 494.

Finally in the command string flow diagram, FIG. 7, if a key closure other than the above keys described for steps 324-327 is detected, a PG error message will be generated at 328.

Alarm and Unattended Recording

Figure 13:
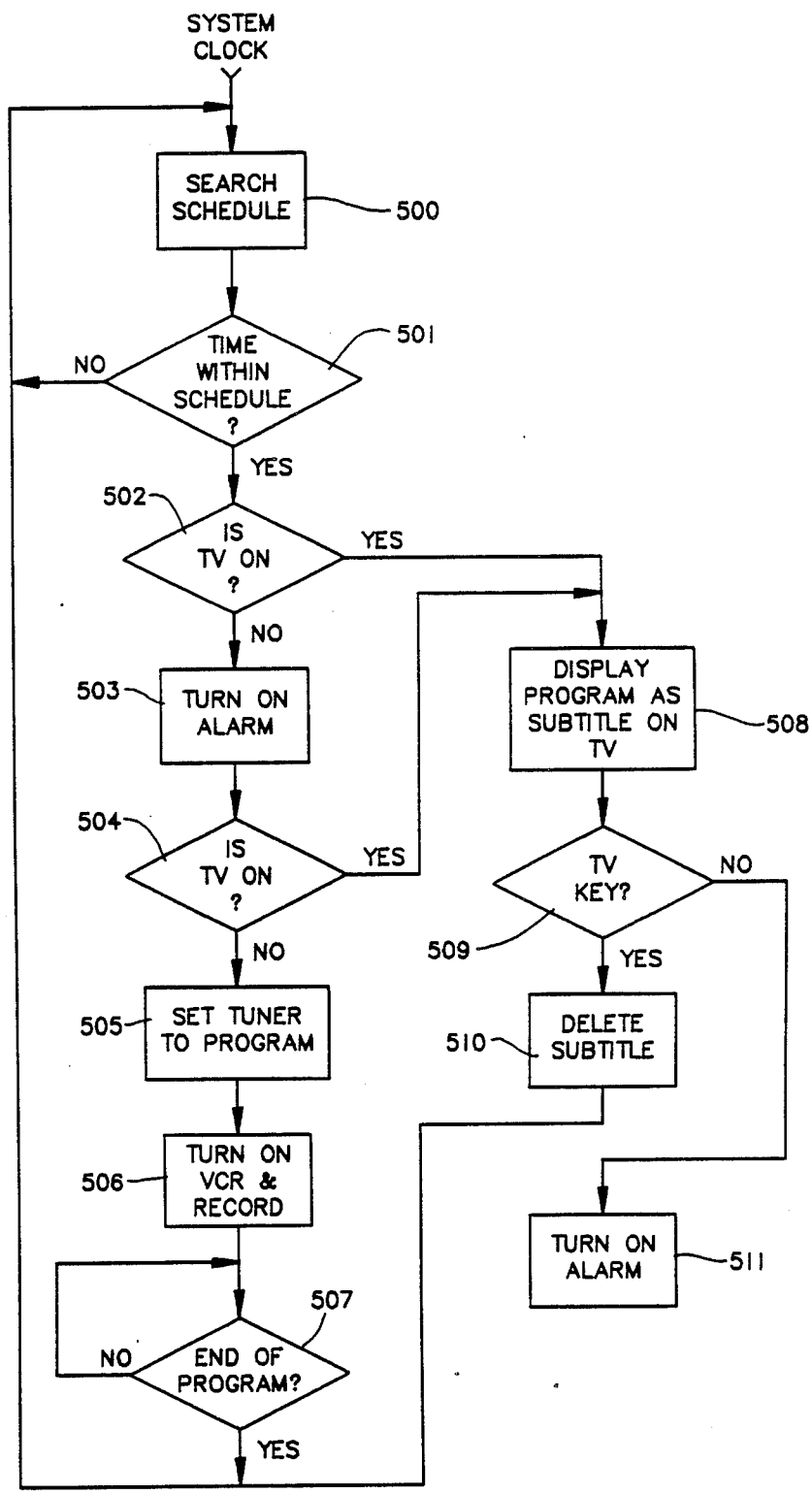

Referring to the alarm flow chart, FIG. 13, a schedule search is made once a minute at 500. If the system clock time is within the schedule time at 501, the TV set 126 or 200 is tested to see if it is on or off at 502. If the TV 126 or 200 is on, a sub-title showing the name of the scheduled list that produced the alarm will be displayed at 508. If the TV key 226 is detected at 509, the sub-title will be deleted at 510. If the TV key 226 is not detected when the scheduled program is active, the alarm 156 or 217 will be sounded at 511.

If the TV 126 or 200 is not on at 502, the alarm 156 or 217 will be sounded five minutes before the start of the scheduled program at 503. If the TV is still not on at 504, the programmable tuner 132 of FIG. 3 or 164 of FIG. 4 will be set to the scheduled program at 505. The VCR 150 or 216 will be turned on by a signal on line 154 or line 218, respectively, to record the program at 506. At the end of the program at 507, a new search is commenced at 500.

For unattended recording with the TV scheduler 160 of FIG. 4B, turn on of the remote VCR 216 is accomplished by means of the remote controller 1010 connected to the TV scheduler 160. Turn-on, record and turn-off are all actuated remotely as described above in connection with FIG. 4B.

Broadcast Format

Each program listing is framed with the following information;

| | |
|---|---|
| Start time | hour, minute |
| Duration of program | hour, minutes |
| Channel number | two digits |
| Theme classification number | two digits |
| Theme subclassification number | two digits |
| Linking number (only for serial shows) | three digits |
| Optional expanded listing | text up to 300 characters |
| End of Program | single character |
| Satellite symbol | two characters |
| Satellite name | five characters |
| Encrypted and any special broadcast indicators | one character |

Program listings are contained within a variable length data block of about 1,000 bytes. Each block includes CRC codes to allow correction of short burst errors of up to six characters.

The systems shown in FIGS. 1-4 are preferably implemented with the commercially available subsystems shown in the following table.

| Reference Nos. | Subsystem | Source |
|---|---|---|
| 22 | IBM PC/AT | IBM Corporation, Boca Raton, Florida |
| 26, 102, 169 | Hayes Smartmodem 1200 | Hayes Microcomputer Products, Norcross Georgia |
| 106, 180 | Little Board/186 Microcomputer | Ampro Computers, Inc. Mountain View, California |
| 116, 188 | Remote Control Transmitter Model SDA 2208-2 | Siemens Iselin, N.J. |
| 118, 190 | Remote Control Receiver Model SAB 4209 | Siemens |
| 126, 200 | Sony KV-2670R with auxilliary input | Sony Corp. New York, N.Y. |
| 132, 164 | Programmable Tuner SA 210 | Siemens |
| 98 | Quotrex FM/SCA Receiver | Data Speed, San Mateo, California |
| 136, 204 | Motorola CRT Controller MC6845 | Motorola, Inc. Austin, Texas |
| 1010, 1020 | JVC Model RM-P67U Wireless Remote Control | JVC Co. of America Elmwood Park, N.J. |

It should now be readily apparent to those skilled in the art that a novel electronic system and process for controlling a television receiver to allow user selection of broadcast programs from schedule information capable of achieving the stated objects of the invention has been provided. The system and process of this invention allows the user to supply selection criteria to the system and in the process that can be combined to search a substantial quantity of schedule information received as a broadcast or otherwise supplied to the system to choose programs meeting the selection criteria. The system and process of this invention will determine if the viewer's television set is turned on at the time of a selected broadcast program, and will automatically record the selected program on a VCR or other program recording device if the television set is not turned on.

It should further be apparent to those skilled in the art that various changes in form and details of the invention as shown and described may be made. For example, the schedule information could be accessible with a personal computer through an information utility, such as Compuserve or The Source, and the user could either make the selection inputs to the utility's mainframe for running a selection program on the mainframe and then download the selected program information, or download the program schedule information for his or her locality, then run the selection program with the downloaded program schedule information on the personal computer. The television set and VCR could then be controlled as peripherals of the personal computer. Alternatively, the user could employ the selected program information from the personal computer to control the television receiver or VCR manually in the process of this invention. A diskette containing broadcast information could be used instead of a direct broadcast as an input to the TV soheduler. The diskette can be read by a computer that controls a programmable TV tuner. The TV scheduler can be used to control a satellite programmable tuner as well as a TV programmable tuner. If the user selects a listing of a program that is broadcast by satellite, the scheduler will automatically set the satellite tuner, as well as the TV tuner, to correspond to the selected listing. It is intended that such changes be included within the spirit and scope of the claims appended hereto.

What is claimed is:

1. A system for controlling a television receiver to allow user selection of broadcast programs from schedule information, which comprises a data processor, a first input means for the schedule information connected to said data processor, a second user selection input means connected to said data processor, said data processor being configured to select programs from the schedule information based on user inputs, storage means connected to receive the schedule information for programs selected by said data processor, and a programmable tuner for connection to the television receiver, said programmable tuner being connected to receive control signals from said data processor at a time of a selected broadcast for causing said programmable tuner to supply broadcast signals for the selected program to the television receiver, said data processor being configured to supply an actuating signal to a program recorder at the time of a broadcast program selected by said data processor and to supply the broadcast signal for the selected program to said program recorder, said system being configured to allow said television receiver to receive a different program than the broadcast signal for the selected program supplied to said program recorder.

2. The system of claim 1 additionally comprising a video display generator connected to receive signals from said data processor for generating a video display from the schedule information and the user selections on the television receiver, and a video switcher connected to receive video display signals from said video display generator, broadcast program signals from said programmable tuner and control signals from said data processor for selecting between the video display signals and the broadcast program signals for supplying to the television receiver.

3. The system of claim 2 in which said data processor and said video display generator are further configured to display names of program services in the schedule information.

4. The system of claim 2 in which said data processor and said video display generator are further configured to present a preselected portion of the schedule information for the user selection.

5. The system of claim 1 in which the schedule information is also broadcast and said first input means comprises a broadcast signal receiver connected to supply the broadcast schedule information to said data processor.

6. The system of claim 5 in which said broadcast signal receiver is a frequency modulation receiver configured to receive the broadcast schedule information independently of the broadcast programs, said first input means includes a data demodulator connected to supply the schedule information to said data processor, said frequency modulation receiver being connected to supply the broadcast schedule information to said data demodulator.

7. The system of claim 5 in which the schedule information is broadcast in an otherwise unused portion of a television program broadcast, said programmable tuner includes said broadcast signal receiver, said first input means includes a data demodulator connected to supply the schedule information to said data processor, and said programmable tuner is connected to supply the schedule information portion of the television program broadcast to said data demodulator.

8. The system of claim 1 in which said data processor is further configured to supply an actuating signal to a program recorder at the time of a broadcast program selected by said data processor and to supply the broadcast signal for the selected program to said program recorder.

9. The system of claim 1 additionally comprising a video display generator connected to receive signals from said data processor for generating a video display from the schedule information and the user selections on the television receiver, and a video switcher connected to receive video display signals from said video display generator, broadcast program signals from said programmable tuner and control signals from said data processor for selecting between the video display signals and the broadcast program signals for supplying to the television receiver, and in which the schedule information is also broadcast and said first input means comprises a broadcast signal receiver connected to supply the broadcast schedule information to said data processor.

10. The system of claim 9 in which said data processor is further configured to provide signals to said video display generator for presenting a plurality of user selection menus on the television receiver, and said second user selection input means includes a plurality of keys for making selections from the menus for choosing programs from the schedule information.

11. The system of claim 1 in which said programmable tuner receives both the schedule information and the broadcast signals for the selected programs, said programmable tuner being connected as part of said first input means.

12. A system for controlling a television receiver to allow user selection of broadcast programs from schedule information, which comprises a data processor, a first input means for the schedule information connected to said data processor, a second user selection input means connected to said data processor, said data processor being configured to select programs from the schedule information based on user inputs, storage means connected to receive the schedule information for programs selected by said data processor, and a programmable tuner for connection to the television receiver, said programmable tuner being connected to receive control signals from said data processor at a time of a selected broadcast for causing said programmable tuner to supply broadcast signals for the selected programs to the television receiver, said data processor being configured to provide signals to said video display generator for presenting a plurality of user selection menus on the television receiver, and said second user selection input means includes a plurality of keys for making selections from the menus for choosing programs from the schedule information, said data processor being configured to allow combinations of the menu selections for choosing programs from the schedule information.

13. A system for controlling a television receiver to allow user selection of broadcast programs from schedule information, which comprises a data processor, a first input means for the schedule information connected to said data processor, a second user selection input means connected to said data processor, said data processor being configured to select programs from the schedule information based on user inputs, storage means connected to receive the schedule information for programs selected by said data processor, and a programmable tuner for connection to the television receiver, said programmable tuner being connected to receive control signals from said data processor at a time of a selected broadcast for causing said programmable tuner to supply broadcast signals for the selected programs to the television receiver, said data processor being configured to supply an actuating signal to a program recorder at the time of a broadcast program selected by said data processor and to supply the broadcast signal for the selected program to said program recorder, said data processor being configured to receive an input signal for determining whether the television receiver is operating at the time of the broadcast program selected by said data processor and to supply the actuating signal to said program recorder unless the television receiver is operating.

14. A system for controlling a television receiver to allow user selection of broadcast programs from schedule information, which comprises a data processor, a first input means for the schedule information connected to said data processor, a second user selection input means connected to said data processor, said data processor being configured to select programs from the schedule information based on user inputs, storage means connected to receive the schedule information for programs selected by said data processor, and a programmable tuner for connection to the television receiver, said programmable tuner being connected to receive control signals from said data processor at a time of a selected broadcast for causing said programmable tuner to supply broadcast signals for the selected programs to the television receiver, said data processor being configured to supply an actuating signal to a program recorder at the time of a broadcast program selected by said data processor, said data processor being connected to a remote controller for said program recorder to supply control signals to said remote controller for recording of the selected program.

15. A system for controlling a television receiver to allow user selection of broadcast programs from schedule information, which comprises a data processor, a first input means for the schedule information connected to said data processor, a second user selection input means connected to said data processor, said data processor being configured to select programs from the schedule information based on user inputs, storage means connected to receive the schedule information for programs selected by said data processor, and a programmable tuner for connection to the television receiver, said programmable tuner being connected to receive control signals from said data processor at a time of a selected broadcast for causing said programmable tuner to supply broadcast signals for the selected programs to the television receiver, said data processor being configured to supply an actuating signal to a program recorder at the time of a broadcast program selected by said data processor and to supply the broadcast signal for the selected program to said program recorder, the broadcast signals including end of program information for at least programs of uncertain duration, and said data processor being configured to terminate recording by the program recorder in response to the end of program information.

16. A system for controlling a television receiver to allow user selection of broadcast programs from schedule information, which comprises a data processor, a first input means for the schedule information connected to said data processor, a second user selection input means connected to said data processor, said data processor being configured to select programs from the schedule information based on user inputs, storage means connected to receive the schedule information for programs selected by said data processor, and a programmable tuner for connection to the television receiver, said programmable tuner being connected to receive control signals from said data processor at a time of a selected broadcast for causing said programmable tuner to supply broadcast signals for the selected programs to the television receiver, the schedule information including linking information to identify multiple programs of a single series and said data processor being configured to select the multiple programs of the single series on the basis of the linking information in response to user selection of one of the programs in the single series.

17. A system for controlling a television receiver to allow user selection of broadcast programs from schedule information, which comprises a data processor, a first input means for the schedule information connected to said data processor, a second user selection input means connected to said data processor, said data processor being configured to select programs from the schedule information based on user inputs, storage means connected to receive the schedule information for programs selected by said data processor, and a programmable tuner for connection to the television receiver, said programmable tuner being connected to receive control signals from said data processor at a time of a selected broadcast for causing said programmable tuner to supply broadcast signals for the selected programs to the television receiver, said data processor being configured to receive an input signal for determining whether the television receiver is operating prior to the time of a broadcast program selected by said data processor, said system further comprising an alarm connected to receive an actuating signal from said data processor, and said data processor being configured to provide the actuating signal to said alarm unless the television receiver is operating when said data processor checks the television receiver for operation.

18. A process for controlling the presentation of broadcast programs to a television receiver, which comprises supplying program schedule information to a data processor, supplying user program selection criteria to the data processor, combining user selection criteria, selecting those programs meeting the combined user selection criteria for viewing from the program schedule information in the data processor, storing information identifying the selected programs, and using the stored information to tune the television receiver to the selected programs.

19. The process of claim 18 in which the television receiver is used as a display by the data processor for presenting messages to the user during the process.

20. The process of claim 19 in which names of program services are displayed in the schedule information.

21. The process of claim 19 in which only a preselected portion of the schedule information is presented for the user selection.

22. The process of claim 18 in which at least some of the user selection criteria are supplied to the data processor by presenting a menu from the data processor on a display and allowing the user to select an item from the menu.

23. The process of claim 18 further comprising the steps of checking for a conflict between a selected program and a previously selected program and providing an indication to the user of such conflict.

24. The process of claim 18 in which the program schedule information is supplied to the data processor by broadcast.

25. The process of claim 24 in which the program schedule information is supplied as a separate broadcast from the program broadcasts.

26. The process of claim 24 in which the television receiver is used as a display by the data processor for presenting messages to the user during the process.

27. The process of claim 26 in which at least some of the user selection criteria are supplied to the data processor by presenting a menu from the data processor on a display and allowing the user to select an item from the menu.

28. The process of claim 27 further comprising the steps of checking for a conflict between a selected program and a previously selected program and providing an indication to the user of such conflict.

29. The process of claim 28 further including the steps of providing linking information to identify multiple programs of a single series and selecting the multiple programs of the single series on the basis of the linking information in response to user selection of one of the programs in the single series.

30. The process of claim 29 additionally comprising the steps of using the data processor to turn on a broadcast program recording device for a selected broadcast program and recording the selected broadcast program on the program recording device.

31. The process of claim 24 in which the program schedule information and the programs are broadcast together, the process additionally comprising the step of separating the program schedule information from the programs for supplying the program schedule information to the data processor.

32. A process for controlling the presentation of broadcast programs to a television receiver, which comprises supplying program schedule information to a data processor, supplying user program selection criteria to the data processor, using the user selection criteria to select programs for viewing from the program schedule information in the data processor, storing information identifying the selected programs, using the stored information to tune the television receiver to the selected programs, using the television receiver as a display by the data processor for presenting messages to the user during the process, including time remaining for a program being broadcast.

33. A process for controlling the presentation of broadcast programs to a television receiver, which comprises supplying program schedule information to a data processor, supplying user program selection criteria to the data processor, using the user selection criteria to select programs for viewing from the program schedule information in the data processor, storing information identifying the selected programs, using the stored information to tune the television receiver to the selected programs, turning on a broadcast program recording device for a selected broadcast program, recording the selected broadcast program, and supplying a different program broadcast signal to the television receiver than the broadcast signal for the selected program supplied to the program recording device.

34. A process for controlling the presentation of broadcast programs to a television receiver, which comprises supplying program schedule information to a data processor, supplying user program selection criteria to the data processor, using the user selection criteria to select programs for viewing from the program schedule information in the data processor, storing information identifying the selected programs, using the stored information to tune the television receiver to the selected programs, turning on a broadcast program recording device for a selected broadcast program, recording the selected broadcast program, broadcasting end of program information for at least programs of uncertain duration, and terminating recording by the program recording device in response to the end of program information.

35. A process for controlling the presentation of broadcast programs to a television receiver, which comprises supplying program schedule information to a data processor, supplying user program selection criteria to the data processor, using the user selection criteria to select programs for viewing from the program schedule information in the data processor, storing information identifying the selected programs, using the stored information to tune the television receiver to the selected programs, turning on a broadcast program recording device for a selected broadcast program, recording the selected broadcast program, determining whether the television receiver is operating at the time of the selected broadcast program and turning on the recording device and recording the selected broadcast program unless the television receiver is operating.

36. A process for controlling the presentation of broadcast programs to a television receiver, which comprises supplying program schedule information to a data processor, supplying user program selection criteria to the data processor, using the user selection criteria to select programs for viewing from the program schedule information in the data processor, storing information identifying the selected programs, using the stored information to tune the television receiver to the selected programs, turning on the program recording device, and recording the selected program by supplying control signals to a remote controller for the program recording device.

37. A process for controlling the presentation of broadcast programs to a television receiver, which comprises supplying program schedule information to a data processor, supplying user program selection criteria to the data processor, using the user selection criteria to select programs for viewing from the program schedule information in the data processor, storing information identifying the selected programs, using the stored information to tune the television receiver to the selected programs, providing linking information to identify multiple programs of a single series and selecting the multiple programs of the single series on the basis of the linking information in response to user selection of one of the programs in the single series.

38. A process for controlling the presentation of broadcast programs to a television receiver, which comprises supplying program schedule information to a data processor, supplying user program selection criteria to the data processor, using the user selection criteria to select programs for viewing from the program schedule information in the data processor, storing information identifying the selected programs, using the stored information to tune the television receiver to the selected programs, determining whether the television receiver is operating prior to the time of a broadcast program selected by the process and providing an alarm signal to the user unless the television receiver is operating when the television receiver is checked for operation.

39. A system for controlling a television receiver to allow user selection of broadcast programs from schedule information, which comprises a data processor, a first input means for the schedule information connected to said data processor, a second user selection input means connected to said data processor, said data processor being configured to select programs from the schedule information based on user inputs, storage means connected to receive the schedule information for programs selected by said data processor, and a programmable tuner for connection to the television receiver, said programmable tuner being connected to receive control signals from said data processor at a time of a selected broadcast for causing said programmable tuner to supply broadcast signals for the selected programs to the television receiver, a video display generator connected to receive signals from said data processor for generating a video display from the schedule information and the user selections on the television receiver, and a video switcher connected to receive video display signals from said video display generator, broadcast program signals from said programmable tuner and control signals from said data processor for selecting between the video display signals and the broadcast program signals for supplying to the television receiver, the schedule information also being broadcast, said first input means comprising a broadcast signal receiver connected to supply the broadcast schedule information to said data processor, said data processor being configured to provide signals to said video display generator for presenting a plurality of user selection menus on the television receiver, said second user selection input means including a plurality of keys for making selections from the menus for choosing programs from the schedule information, said data processor being configured to allow combinations of the menu selections for choosing programs from the schedule information.

40. The system of claim 39 in which the schedule information includes linking information to identify multiple programs of a single series and said data processor is further configured to select the multiple programs of the single series on the basis of the linking information in response to user selection of one of the programs in the single series.

41. The system of claim 40 in which said data processor is further configured to supply an actuating signal to a program recorder at the time of a broadcast program selected by said data processor.

42. A system for controlling a recording device to allow user selection of broadcast programs from schedule information, which comprises a data processor, a first input means for the schedule information connected to said data processor, a second user selection input means connected to said data processor, said data processor being configured to select programs from the schedule information based on user inputs, storage means connected to receive the schedule information for programs selected by said data processor, a programmable tuner for connection to the recording device, said programmable tuner being connected to receive control signals from said data processor at a time of a selected broadcast for causing said programmable tuner to supply broadcast signals for the selected programs to the recording device, and a television receiver, said system being configured to allow said television receiver to receive a different program than the broadcast signal for the selected program supplied to said recording device.

43. The system of claim 42 additionally comprising a display means connected to receive signals from said data processor for generating a display from the schedule information and the user selections on said display means.

44. The system of claim 43 in which said data processor and said display means are further configured to present a preselected portion of the schedule information for the user selection.

45. The system of claim 43 in which the schedule information is broadcast and said first input means comprises a broadcast signal receiver connected to supply the broadcast schedule information to said data processor.

46. The system of claim 45 in which said broadcast signal receiver is a frequency modulation receiver configured to receive the broadcast schedule information independently of the broadcast programs, said first input means includes a data demodulator connected to supply the schedule information to said data processor, said frequency modulation receiver being connected to supply the broadcast schedule information to said data demodulator.

47. The system of claim 45 additionally comprising a television receiver, and in which the schedule information is broadcast in an otherwise unused portion of a television program broadcast, said programmable tuner includes said broadcast signal receiver, said first input means includes a data demodulator connected to supply the schedule information to said data processor, and said programmable tuner is connected to supply the schedule information portion of the television program broadcast to said data demodulator.

48. The system of claim 43 in which said data processor is further configured to provide signals to said display means for presenting a plurality of user selection menus on said display means and said second user selection input means includes a plurality of keys for making selections from the menus for choosing programs from the schedule information.

49. The system of claim 48 in which said data processor is further configured to allow combinations of the menu selections for choosing programs from the schedule information.

50. The system of claim 42 in which said programmable tuner receives both the schedule information and the broadcast signals for the selected programs, said programmable tuner being connected as part of said first input means.

51. A system for controlling a recording device to allow user selection of broadcast programs from schedule information, which comprises a data processor, a first input means for the schedule information connected to said data processor, a second user selection input means connected to said data processor, said data processor being configured to select programs from the schedule information based on user inputs, storage means connected to receive the schedule information for programs selected by said data processor, a programmable tuner for connection to the recording device, said programmable tuner being connected to receive control signals from said data processor at a time of a selected broadcast for causing said programmable tuner to supply broadcast signals for the selected programs to the recording device, said data processor being connected to a remote controller for said recording device to supply control signals to said remote controller for powering on said recording device, starting and stopping recording of the selected program and powering off said recording device.

52. A system for controlling a recording device to allow user selection of broadcast programs from schedule information, which comprises a data processor, a first input means for the schedule information connected to said data processor, a second user selection input means connected to said data processor, said data processor being configured to select programs from the schedule information based on user inputs, storage means connected to receive the schedule information for programs selected by said data processor, a programmable tuner for connection to the recording device, said programmable tuner being connected to receive control signals from said data processor at a time of a selected broadcast for causing said programmable tuner to supply broadcast signals for the selected programs to the recording device, the broadcast signals including end of program information for at least programs of uncertain duration, and said data processor being configured to terminate recording by the recording device in response to the end of program information.

53. A system for controlling a recording device to allow user selection of broadcast programs from schedule information, which comprises a data processor, a first input means for the schedule information connected to said data processor, a second user selection input means connected to said data processor, said data processor being configured to select programs from the schedule information based on user inputs, storage means connected to receive the schedule information for programs selected by said data processor, a programmable tuner for connection to the recording device, said programmable tuner being connected to receive control signals from said data processor at a time of a selected broadcast for causing said programmable tuner to supply broadcast signals for the selected programs to the recording device, the schedule information including linking information to identify multiple programs of a single series and said data processor being configured to select the multiple programs of the single series on the basis of the linking information in response to user selection of one of the programs in the single series.

54. A system for controlling receipt of broadcast television programs to allow user selection of broadcast programs from broadcast schedule information, which comprises a data processor, a programmable tuner configured to receive both the broadcast programs and the broadcast schedule information connected to said data processor, means connected between said programmable tuner and said data processor for separating the broadcast schedule information from the broadcast programs and supplying the broadcast schedule information to said data processor, a user selection input means connected to said data processor, said data processor being configured to select programs from the schedule information based on user inputs, storage means connected to receive the schedule information for programs selected by said data processor, said programmable tuner being connected to receive control signals from said data processor at a time of a selected broadcast for causing said programmable tuner to supply signals for the selected broadcast programs to at least one signal receiver for the selected broadcast programs.

55. The system for controlling receipt of broadcast television programs of claim 54 in which said at least one signal receiver comprises a recording device.

56. The system for controlling receipt of broadcast television signals of claim 55 in which said at least one signal receiver additionally comprises a television, and said system additionally comprises a means for switching between said recording device and said television for receiving the signals for the selected broadcast programs.

* * * * *

REEXAMINATION CERTIFICATE (2148th)
United States Patent [19]
Young

[11] B1 4,706,121
[45] Certificate Issued Dec. 14, 1993

[54] TV SCHEDULE SYSTEM AND PROCESS

[75] Inventor: Patrick Young, San Mateo, Calif.

[73] Assignee: Insight Telecast, Inc., San Mateo, Calif.

Reexamination Request:
No. 90/002,537, Dec. 6, 1991

Reexamination Certificate for:
Patent No.: 4,706,121
Issued: Nov. 10, 1987
Appl. No.: 860,077
Filed: May 6, 1986

[51] Int. Cl.$^5$ .................. H04N 7/08; H04N 7/093
[52] U.S. Cl. ........................... 358/142; 358/146;
358/147; 358/335; 340/825.22; 360/33.1;
369/19; 455/151.4; 455/181.2; 455/186.4;
968/977; 968/DIG. 1
[58] Field of Search ............... 358/147, 146, 142, 141,
358/335, 189, 84, 85, 86, 191.1; 455/151.4,
181.2, 186.2; 360/33.1

[56] References Cited

U.S. PATENT DOCUMENTS

| | | |
|---|---|---|
| 4,031,548 | 6/1977 | Kato et al. |
| 4,081,753 | 3/1978 | Miller . |
| 4,170,782 | 10/1979 | Miller . |
| 4,305,101 | 12/1981 | Yarbrough et al. |
| 4,329,684 | 5/1982 | Monteath et al. ............... 235/472 |
| 4,381,522 | 4/1983 | Lambert . |
| 4,388,179 | 6/1983 | Kruger et al. |
| 4,390,901 | 6/1983 | Keiser ............................ 358/147 |
| 4,598,288 | 7/1986 | Yarbrough et al. |
| 4,635,121 | 1/1987 | Hoffman et al. ............... 358/188 |
| 4,641,205 | 2/1987 | Beyers, Jr. |
| 4,689,022 | 8/1987 | Peers et al. |
| 4,712,105 | 12/1987 | Kohler . |
| 4,751,578 | 6/1988 | Reiter et al. |
| 4,754,326 | 6/1988 | Kram et al. |
| 4,787,063 | 11/1988 | Muguet . |
| 4,908,713 | 3/1990 | Levine . |
| 4,963,994 | 10/1990 | Levine . |

FOREIGN PATENT DOCUMENTS

| | | |
|---|---|---|
| 3337204 | 4/1985 | Fed. Rep. of Germany ...... 358/335 |
| 2034995 | 10/1979 | United Kingdom . |
| 2126002 | 3/1984 | United Kingdom . |

OTHER PUBLICATIONS

Rundfunktechnische Mitteilungen, vol. 26, No. 6, Nov.-Dec. 1982, pp. 254–257, Norderstedt, DE, G. Hoffman et al., "Videotext Programmiert Videorecorder", *En entier*.
Merrell, "Tac-Timer," 1986 NCTA Technical Papers, pp. 203–206.
James, "ORACLE-Broadcasting the Written Word," Wireless World, Jul. 1973, pp. 314–316.
Carnes, "The Wired Household," IEEE Spectrum, Oct. 1979, pp. 61–66.
McKenzie, "ORACLE—An Information Broadcasting Service Using Data Transmission in the Vertical Interval," Journal of the SMPTE, Jan. 1974, pp. 6–10.
Edwardson et al, "CEEFAX—A Proposed New Broadcasting Service," Journal of the SMPTE, Jan. 1974, pp. 14–19.

*Primary Examiner*—James J. Groody

[57] ABSTRACT

A system (90) controls a television receiver (126) to allow user selection of broadcast programs from schedule information. A data processor (110) is connected to receive the schedule information from an FM receiver (94), decoder (98) and data demodulator (102). A user remote control transmitter 116-remote receiver (118) combination supplies user selection inputs to the data processor (110). The data processor (110) selects programs from the schedule information based on the user inputs. The schedule information for the selected programs is stored in a memory (111), and is used by the data processor (110) to control a programmable TV tuner (132) to provide the broadcast signals for the selected programs to the TV receiver (126) at the time of broadcast. The system (90) can also be used to control a VCR (150) for unattended recording of the selected programs.

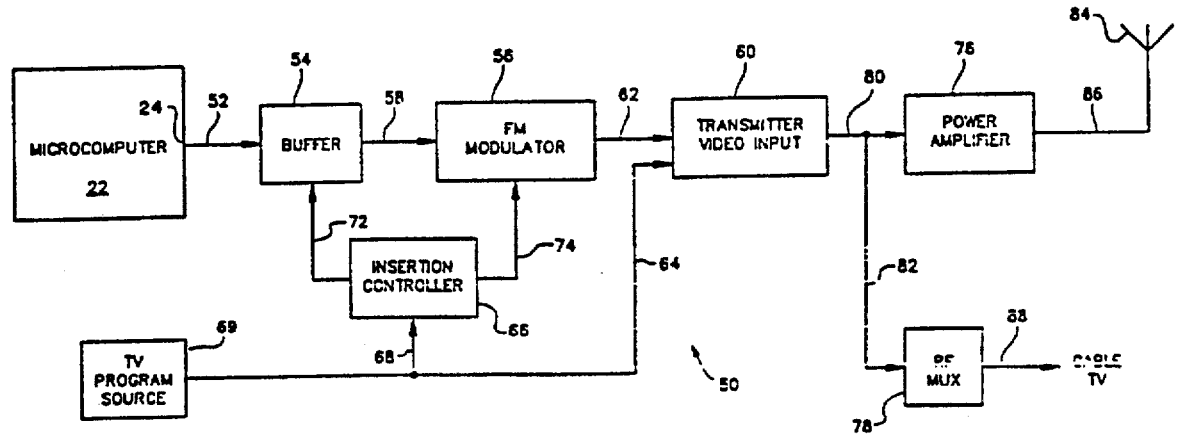

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 7, lines 33-59:

FIG. 3 is a block diagram of a receiver and television receiver control system 90 which is used in combination with the FM transmitter system 20 of FIG. 1. An FM antenna 92 receives the broadcast signals from the system 20, which are supplied to FM receiver 94 on line 96. FM receiver 94 supplies the FM broadcast signals to an SCA subcarrier decoder 98 on line 100. The decoder 98 strips the schedule information signals from the FM broadcast signals and supplies the schedule information signals to a data demodulator 102 on line 104. The data demodulator 102 converts the schedule information signals to digital form and supplies the digital schedule data signals to system control unit 106 on line 108, more particularly, to CPU 110 of the system control unit 106. A memory 111 is connected to the CPU 110 at 113. A control program for the system control unit 106 and a user identification code are stored in a read only memory (ROM) 112. ROM 112 communicates with the CPU 110 on line 114. Other inputs to the CPU 110 are supplied by a remote transmitter controller 116-remote receiver 118 combination on line 120, which supplies user selection and other user inputs to the CPU 110, and on line 122, connected to power input 124 of television receiver 126, which allows CPU 110 to determine if the receiver 126 is turned on. System clock 128 of the system control unit 106 is connected to the FM receiver 94 by line 130.

Column 15, lines 19-31:

PG+Schedule Setup

This mode allows the user to create a weekly reminder calendar *schedule stored in memory*, typically for weekly series and special events of non-weekly programs. The reminder process will set an alarm if the TV is not on before a certain time before the start of the program. If the TV is not on when the program starts, the reminder process will turn on the VCR to start recording the program.

The *reminder calendar* schedule may be programmed to respond to either a single program of a series or all programs of a series. For example, a daily or weekly show may be scheduled for a particular day or for all occurrences in the program listing.

Column 15, lines 46-58:

When the schedule mode is entered, a split screen displays the scheduled program on the top eight lines and the program list on the bottom eight lines. This listing is identical to the MG listing, except that a shortened listing is displayed instead of 16. All other MG parameters, such as Prime, Channel, and Theme are in effect. The user should review the MG status before setting up the *reminder calendar* schedule. Up to 16 programs can be entered in the *reminder calendar* schedule listing using two pages of display. The page keys 232 and 234 are used to access the second page. Either the up or down keys 232 and 234 will toggle the *reminder calendar* schedule listing.

A typical *reminder calendar* schedule is shown below:

Column 16, lines 5-14:

The cursor and pages keys 232-238 operation is identical to the MG mode except the range is restricted to either the upper or lower half of the display. If the cursor points to the top of the program listing (line 9), the listing will scroll down a half page (eight lines). If the cursor points to the bottom of the *reminder calendar* schedule (line 8), the *reminder calendar* schedule will shift to the next page. To cross from *reminder calendar* schedule to program list, and vice versa, the P key is used. The cursor will reposition itself to the top of the new selection.

Column 16, lines 18-27:

To add a program to the *reminder calendar* schedule, use the P key 240 to toggle the cursor to the program listing (lower half of display). Use the cursor, page, or + keys 232-234, 236-238 or 244 to locate the desired program. Use the SEL key 228 to store the program in the *reminder calendar* schedule. The upper screen will immediately display the new addition. If the page is full, the Program Master will automatically switch to the next page. If both pages are full, the status line will show a FULL message.

Column 17, lines 38-49:

A search of the program listing 352, *stored in program list buffer 303*, is made. The search is dependent on the status of the channel buffer, the theme buffer, the prime time buffer, and the direction of search. If the page 356 is up, the search direction is forward starting from the list pointer. If the page is down 357, the search direction will be backward 358 from the current list pointer. When the search satisfies the above criteria, the program listing *from program list buffer 303* is placed into the screen buffer 353. The search continues until the screen buffer is full 354 in which case the search is terminated. The status lines information is passed to the screen buffer and displayed 355 by the TV. *Program list buffer 303, screen buffer 353, and the other buffers discussed above comprise a data storage means.*

AS A RESULT OF REEXAMINATION, IT HAS BEEN DETERMINED THAT:

The patentability of claims 13, 16, 17, 32, 35, and 53 is confirmed.

Claim 8 is cancelled.

Claims 1, 4, 12, 14, 15, 18, 21, 29, 33, 34, 36-39, 42, 51, 52 and 54 are determined to be patentable as amended.

Claims 2, 3, 5-7, 9-11, 19, 20, 22-28, 30, 31, 40, 41, 43-50, 55, and 56, dependent on an amended claim, are determined to be patentable.

New claims 57–67 are added and determined to be patentable.

1. A system for controlling a television receiver to allow user selection of broadcast programs from schedule information *stored in a storage means*, which comprises a data processor, a first input means for the schedule information connected to said data processor, a second user selection input means connected to said data processor, said data processor being configured to select programs from the schedule information *stored in said storage means* based on user inputs, *said* storage means *being* connected to receiver *a reminder calendar list comprising* the schedule information for programs selected by said data processor, and a programmable tuner for connection to the television receiver, said programmable tuner being connected to receiver control signals from said data processor at a time of a selected broadcast for causing said programmable tuner to supply broadcast signals for the selected program to the television receiver, said data processor being configured to supply an actuating signal to a program recoder at the time of a broadcast program selected by said data processor and to supply the broadcast signal for the selected program to said program recorder, said system being configured to allow said television receiver to receive a different program than the broadcast signal for the selected program supplied to said program recorder, *wherein said user inputs comprise a plurality of user program selection criteria in addition to any time-period programs selection criteria, said data processor being configured to combine said plurality of program selection criteria and to present a list of programs meeting said combined program selection criteria, said user inputs further comprising a program choice from said presented list of program, said reminder calendar list comprising information identifying titles for said programs selected by said data processor.*

4. The system of claim 2 in which said data processor and said video display generator are further configured to present a preselected portion of the schedule information for the user selection, *wherein said preselected portion is preselected by said data processor according to at least one of a current time and a current channel of said programmable tuner.*

12. A system for controlling a television receiver to allow user selection of broadcast programs from schedule information *stored in a storage means*, which comprises a data processor, a first input means for the schedule information connected to said data processor, a second user selection input means connected to said data processor, said data processor being configured to select programs from the schedule information *stored in said storage means* based on user inputs, *said* storage means *being* connected to receive *a reminder calendar list comprising* the schedule information for programs selected by said data processor, and a programmable tuner for connection to the television receiver, said programmable tuner being connected to receive control signals from said data processor at a time of a selected broadcast for causing said programmable tuner to supply broadcast signals for the selected programs to the television receiver, said data processor being configured to provide signals to [said] *a* video display generator for presenting a plurality of user selection menus on the television receiver, and said second user selection input means includes a plurality of keys for making selections from the menus for choosing programs from the schedule information, said data processor being configured to [allow combinations of] *combine* the menu selections for choosing programs from the schedule information, *wherein said menu selections comprise a plurality of user program selection criteria, said data processor being configured to combing said plurality of user program selection criteria and to present a list of programs meeting said combined selection criteria, said menu selected further comprising a program choice from said presented list of programs, said remainder calendar list comprising information identifying titles for said programs selected by said data processor, said data processor being configured to present the reminder calendar list including program titles and to allow user selection therefrom.*

14. A system for controlling a television receiver to allow user selection of broadcast programs from schedule information *stored in a storage means*, which comprises a data processor, a first input means for the schedule information connected to said data processor, a second user selection input means connected to said data processor, said data processor being configured to select programs from the schedule information *stored in said storage means* based on user inputs, *said* storage means *being* connected to receive *a reminder calendar list comprising* the schedule information for programs selected by said data processor, and a programmable tuner for connection to the television receiver, said programmable tuner being connected to receive control signals from said data processor at a time of a selected broadcast for causing said programmable tuner to supply broadcast signals for the selected programs to the television receiver, said data processor being configured to supply an actuating signal to a program recorder at the time of a broadcast program selected by said data processor, said data processor being connected to a remote controller for said program recorder to supply control signals to said remote controller for recording of the selected program, *wherein said user inputs comprise a plurality of independent user program selection criteria, said data processor being configured to combine said plurality of user program selection criteria and to present a list of programs meeting said combined program selection criteria, said user inputs further comprising a program choice from said presented list of programs, said reminder calendar list comprising information identifying titles for said programs selected by said data processor.*

15. A system for controlling a television receiver to allow user selection of broadcast programs from schedule information *stored in a storage means*, which comprises a data processor, a first input means for the schedule information connected to said data processor, a second user selection input means connected to said data processor, said data processor being configured to select programs from the schedule information *stored in said storage means* based on user inputs, *said* storage means *being* connected to receive *a reminder calendar list comprising* the schedule information for programs selected by said data processor, and a programmable tuner for connection to the television receiver, said programmable tuner being connected to receive control signals from said data processor at a time of a selected broadcast for causing said programmable tuner to supply broadcast signals for the selected programs to the television receiver, said data processor being configured to supply an actuating signal to a program recorder at the time of a broadcast program selected by said data processor and to supply the broadcast signal for the selected program to said program recorder, the broadcast signals including end of program information for at least programs of uncertain duration, and said data processor being configured to terminate recording by the program recorder in response to the end of program information, *wherein said user inputs comprise a plurality of user program selection criteria including channel and program theme criteria, said data processor being configured to combine said plurality of user program selection criteria and to present a list of programs meeting said combined program selection criteria, said user inputs further comprising a program choice from said presented list of programs.*

18. A process for controlling the presentation of broadcast programs to a television receiver, which comprises supplying program schedule information to *storage means in* a data processor, supplying user program selection criteria to the data processor, *said user program selection criteria comprising a plurality of independent user chosen program selection criteria and at least one program choice,* the data processor combining *said* user selection criteria, selecting those programs meeting the combined user selection criteria for viewing from the program schedule information in *said storage means in* the data processor, storing information identifying the selected programs, *said stored information identifying broadcast schedule times, channels, and program titles,* and using the stored information to tune the television receiver to the selected programs.

21. The process of claim 19 in which only a preselected portion of the schedule information is presented for the user selection, *wherein said preselected portion is preselected according to a combination of said independent user chosen program selection criteria.*

29. The process of claim 28 further including the steps of providing linking information to identify multiple programs of a single series and selecting the multiple programs of the single series on the basis of the linking information in response to user selection of one of the programs in the single series, *wherein said program schedule information provided to said storage means includes said linking information.*

33. A process for controlling the presentation of broadcast programs to a television receiver, which comprises supplying program schedule information to *storage means in* a data processor, supplying user program selection criteria to the data processor, *the data processor combining said user selection criteria with automatic criteria according to at least one of a current time period and a current channel,* using the *combination of* user selection criteria *and automatic criteria* to select programs for viewing from the program schedule information in *said storage means in* the data processor, storing information identifying the selected programs, using the stored information to tune the television receiver to the selected programs, turning on a broadcast program recording device for a selected broadcast program, recording the selected broadcast program, and supplying a different program broadcast signal to the television receiver than the broadcast signal for the selected program supplied to the program recording device.

34. A process for controlling the presentation of broadcast programs to a television receiver, which comprises supplying program schedule information to *storage means in* a data processor, supplying user program selection criteria to the data processor, *said user program selection criteria comprising a plurality of independent user chosen selection criteria and at least one program choice, the data processor combining said user selection criteria,* using the *combined* user selection criteria to select programs for viewing from the program schedule information in *said storage means in* the data processor, storing information identifying the selected programs *including broadcast schedule times, channels, and program titles,* using the stored information to tune the television receiver to the selected programs, turning on a broadcast program recording device for a selected broadcast program, recording the selected broadcast program, broadcasting end of program information for at least programs of uncertain duration, and terminating recording by the program recording device in response to the end of program information.

36. A process for controlling the presentation of broadcast programs to a television receiver, which comprises supplying program schedule information to *storage means in* a data processor, supplying user program selection criteria to the data processor, *said user program selection criteria comprising a plurality of independent user chosen selection criteria and at least one portion choice, the data processor combining said user selection criteria,* using the *combined* user selection criteria to select programs for viewing from the program schedule information in *said storage means in* the data processor, storing information identifying the selected programs *including broadcast schedule times, channels, and program titles,* using the stored information to tune the television receiver to the selected programs, turning on [the] *a* program recording device, and recording the selected program by supplying control signals to a remote controller for the program recording device.

37. A process for controlling the presentation of broadcast programs to a television receiver, which comprises supplying program schedule information to a data processor, *wherein said program schedule information includes linking information,* supplying user program selection criteria to the data processor, using the user selection criteria to select programs for viewing from the program schedule information in the data processor, storing information identifying the selected programs, using the stored information to tune the television receiver to the selected programs, providing *said* linking information to identify multiple programs of a single series and selecting the multiple programs of the single series on the basis of the linking information in response to user selection of one of the programs in the single series.

38. A process for controlling the presentation of broadcast programs to a television receiver, which comprises supplying program schedule information to *storage means in* a data processor, supplying user program selection criteria to the data processor, *said program selection criteria comprising a plurality of independent user chosen selection criteria and at least one program choice, the data processor combining said user selection criteria,* using the *combined* user selection criteria to select programs for viewing from the program schedule information in *said storage means in* the data processor, storing information identifying the selected programs *including broadcast schedule times, channels, and program titles,* using the stored information to tune the television receiver to the selected programs, determining whether the television receiver is operating prior to the time of a broadcast program selected by the process and providing an alarm signal to the user unless the television receiver is operating when the television receiver is checked for operation.

39. A system for controlling a television receiver to allow user selection of broadcast programs from schedule information *stored in a storage means*, which comprises a data processor, a first input means for the schedule information connected to said data processor, a second user selection input means connected to said data processor, said data processor being configured to select programs from the schedule information based on user inputs, *said* storage means *being* connected to receive the schedule information for programs selected by said data processor, and a programmable tuner for connection to the television receiver, said programmable tuner being connected to receive control signals from said data processor at a time of a selected broadcast for causing said programmable tuner to supply broadcast signals for the selected programs to the television receiver, a video display generator connected to receive signals from said data processor for generating a *combined* video display from the schedule information and the user selections on the television receiver, and a video switcher connected to receive video display signals from said video display generator, broadcast program signals from said programmable tuner and control signals from said data processor for selecting between the video display signals and the broadcast program signals for supplying to the television receiver, the schedule information also being broadcast, said first input means comprising a broadcast signal receiver connected to supply the broadcast schedule information to said data processor, said data processor being configured to provide signals to said video display generator for presenting a plurality of user selection menus on the television receiver, said second user selection input means including a plurality of keys for making selections from the menus for choosing programs from the schedule information, said data processor being configured to [allow combinations of the] *combine a plurality of* menu selections *as selection criteria, including a plurality of channel requirements,* for choosing programs from the schedule information.

42. A system for controlling a recording device to allow user selection of broadcast programs from schedule information, which comprises a data processor, a first input means for the schedule information connected to said data processor, a second user selection input means connected to said data processor, said data processor being configured to select programs from the schedule information based on user inputs, storage means connected to receive the schedule information for programs selected by said data processor, a programmable tuner for connection to the recording device, said programmable tuner being connected to receive control signals from said data processor at a time of a selected broadcast for causing said programmable tuner to supply broadcast signals for the selected programs to the recording device, and a television receiver, said system being configured to allow said television receiver to receive a different program than the broadcast signal for the selected program supplied to said recording device, *wherein said data processor is configured for a selectable display mode, said data processor being configured to present an initial display of said schedule information stored in said storage means upon selection of said display mode, said initial display automatically comprising schedule information for at least one of a current time period and a current channel of said programmable tuner.*

51. A system for controlling a recording device to allow user selection of broadcast programs from schedule information, which comprises a data processor, a first input means for the schedule information connected to said data processor, a second user selection input means connected to said data processor, said data processor being configured to select programs from the schedule information based on user inputs, storage means connected to receive the schedule information for programs selected by said data processor, a programmable tuner for connection to the recording device, said programmable tuner being connected to receive control signals from said data processor at a time of a selected broadcast for causing said programmable tuner to supply broadcast signals for the selected programs to the recording device, said data processor being connected to a remote controller for said recording device to supply control signals to said remote controller for powering on said recording device, starting and stopping recording of the selected program and powering off said recording device, *further comprising a display means coupled to said data processor, wherein said data processor is configured for a selectable display mode, said display means being configured to display an initial display of said schedule information stored in said storage means upon selection of said display mode, said initial display automatically comprising schedule information for at least one of a current time period and a current channel of said programmable tuner.*

52. A system for controlling a recording device to allow user selection of broadcast programs from schedule information, which comprises a data processor, a first input means for the schedule information connected to said data processor, a second user selection input means connected to said data processor, said data processor being configured to select programs from the schedule information based on user inputs, storage means connected to receive the schedule information for programs selected by said data processor, a programmable tuner for connection to the recording device, said programmable tuner being connected to receive control signals from said data processor at a time of a selected broadcast for causing said programmable tuner to supply broadcast signals for the selected programs to the recording device, the broadcast signals including end of program information for at least programs of uncertain duration, and said data processor being configured to terminate recording by the recording device in response to the end of program information, *further comprising a display means coupled to said data processor, wherein said data processor is configured for a selectable display mode, said display means being configured to display an initial display of said schedule information stored in said storage means upon selection of said display mode, said initial display automatically comprising schedule information for at least one of a current time period and a current channel of said programmable tuner.*

54. A system for controlling receipt of broadcast television programs to allow user selection of broadcast programs from broadcast schedule information *which is selectively stored in a storage means*, which comprises a data processor, a programmable tuner configured to receive both the broadcast programs and the broadcast schedule information connected to said data processor, means connected between said programmable tuner and said data processor for separating the broadcast schedule information from the broadcast programs and supplying the broadcast schedule information to said data processor, a user selection input means connected to said data processor, said data processor being configured to select programs from the schedule information stored in said storage means based on user inputs, *said storage means being connected to receive a reminder calendar list comprising* the schedule information for programs selected by said data processor, said programmable tuner being connected to receive control signals from said data processor at a time of a selected broadcast for causing said programmable tuner to supply signals for the selected broadcast programs to at least one signal receiver for the selected broadcast programs, *wherein said user inputs comprise a plurality of user program selection criteria, said data processor being configured to combine said plurality of user program selection criteria and to present a list of programs meeting said combined program selection criteria, said user inputs further comprising a program choice from said presented list of programs, said reminder calendar list comprising information identifying titles for said programs selected by said data processor.*

57. *A television schedule system for controlling receipt of broadcast television programs to allow user selection of broadcast programs from broadcast schedule information displayed on a television, said broadcast schedule information comprising broadcast schedule times, titles and channels, said system comprising:*

*a data processor;*

*a system clock connected to said data processor for providing a system time;*

*a programmable tuner connected to said data processor and configured to receive both the broadcast programs and the broadcast schedule information;*

*signal separating means connected between said programmable tuner and said data processor for separating the broadcast schedule information from the broadcast programs, and for supplying the broadcast schedule information to said data processor;*

*display means connected to said data processor for displaying at least a portion of said broadcast schedule information on said television;*

*user selection input means connected to said data processor for providing user inputs for selecting listings of programs from said displayed broadcast schedule information; and*

*storage means being connected to said data processor for storing schedule information, wherein said data processor is configured to select programs from said displayed broadcast schedule information based on said user inputs, to retrieve broadcast schedule information for said selected programs from said broadcast schedule information supplied to said data processor, and to store said retrieved schedule information in said storage means, said stored broadcast schedule information identifying a broadcast schedule time and channel and a program title for each said selected program; wherein*

*said data processor provides control signals to said programmable tuner when the system time matches a stored broadcast schedule time of one of said selected programs, said control signals causing said programmable tuner to supply broadcast program signals for the stored broadcast schedule channel of said one selected program to at least one signal receiver; and wherein*

*said data processor is configured for a selectable display mode, said display means being configured to display a preselected initial display of said schedule information stored in said storage means upon selection of said display mode, said preselected initial display automatically comprising schedule information meeting initial display selection criteria, said initial display selection criteria including at least one of a current time period and a channel currently selected by said programmable tuner.*

58. *The system of claim 57, wherein said data processor is configured to update said program listings of broadcast schedule information and said stored schedule information for selected programs, in response to updated schedule information being supplied to said data processor.*

59. *The television schedule system of claim 57, wherein said stored broadcast schedule information identifies a program description for each said selected program.*

60. *The television schedule system of claim 57, wherein said preselected initial display automatically comprises schedule information for a channel currently selected by said programmable tuner, and wherein said display means further comprises means for displaying on said television, upon a change to a new channel of said programmable tuner, broadcast schedule information for a current program on said new channel.*

61. *The television schedule system of claim 60, wherein said displayed current program broadcast schedule information comprises a title of said current program.*

62. *The television schedule system of claim 60, wherein said displayed current program broadcast schedule information comprises a remaining time of said current program.*

63. *The television schedule system of claim 57, wherein said user selection input means provides user selection criteria, the data processor being configured to combine a plurality of said user selection criteria with at least one selection criterion chosen automatically by said data processor according to at least one of a current time and a channel currently selected by said programmable tuner, said preselected initial display being of schedule information meeting said combined selection criteria.*

64. *A system for controlling receipt of broadcast television programs to allow user selection of broadcast programs from broadcast schedule information which is selectively stored in a storage means, which comprises a data processor, a programmable tuner congfigured to receive both the broadcast programs and the broadcast schedule information connected to said data processor, means connected between said programmable tuner and said data processor for separating the broadcast schedule information from the broadcast programs and supplying the braodcast schedule information to said data processor, a user selection input means connected to said data processor, said data processor being configured to select programs from the schedule information stored in said storage means based on user inputs, said storage means being connected to receive a reminder calendar list comprising the schedule information for programs selected by said data processor, said programmable tuner being connected to receive control signals from said data processor at a time of a selected broadcast for causing said programmable tuner to supply signals for the selected broadcast programs to at least one signal receiver for the selected broadcast programs, wherein said user inputs comprise a plurality of user program selection criteria including a plurality of channels, said data processor being configured to combine said plurality of user program selection criteria and to present a list of programs meeting said combined program selection criteria, said user inputs further comprising a program choice from said*

*presented list of programs, said remainder calendar list comprising information identifying titles for said programs selected by said data processor.*

65. A system for controlling receipt of broadcast television programs to allow user selection of broadcast programs from broadcast schedule information which is selectively stored in a storage means, which comprises a data processor, a programmable tuner configured to receive both the broadcast programs and the broadcast schedule information connected to said data processor, means connected between said programmable tuner and said data processor for separating the broadcast schedule information from the broadcast programs and supplying the broadcast schedule information to said data processor, a user selection input means connected to said data processor, said data processor being configured to select programs from the schedule information stored in said storage means based on user inputs, said storage means being connected to receive a reminder calendar list comprising the schedule information for programs selected by said data processor, said programmable tuner being connected to receive control signals from said data processor at a time of a selected broadcast for causing said programmable tuner to supply signals for the selected broadcast programs to at least one signal receiver for the selected broadcast programs, wherein said user inputs comprise a plurality of user program selection criteria under a plurality of categories, said categories capable of being activated or deactivated, said user program selection criteria being stored for both activated and deactivated categories, said data processor being configured to combine said user program selection criteria for all currently activated categories and to present a list of programs meeting said combined program selection criteria, said user inputs further comprising a program choice from said displayed list of programs, said reminder calendar list comprising information identifying titles for said programs selected by said data processor.

66. A process for controlling the presentation of broadcast programs to a television receiver, which comprises supplying program schedule information to a storage means in a data processor, supplying user program selection criteria to the data processor, said user program selection criteria comprising a plurality of independent user chosen program selection criteria and at least one program choice, the data processor combining said user selection criteria, selecting those programs meeting the combined user selection criteria for viewing from the program schedule information in said storage means in the data processor, storing information identifying the selected programs, and using the stored information to tune the television receiver to the selected programs.

67. A process for controlling the presentation of broadcast programs to a television receiver, which comprises supplying program schedule information to a storage means in a data processor, supplying user program selection criteria to the data processor, the data processor combining said user selection criteria, selecting those programs meeting the combined user selection criteria for viewing from the program schedule information in said storage means in the data processor, storing information identifying the selected programs, and using the stored information to tune the television receiver to the selected programs, wherein a group of said selection criteria are combined by the data processor as logical alternatives so that the combination of said group of selection criteria is satisfied whenever any one of said selection criteria of said group is met.

* * * * *